(12) United States Patent  
Barbati et al.

(10) Patent No.: US 12,121,968 B2  
(45) Date of Patent: Oct. 22, 2024

(54) METHODS AND DEVICES FOR THREE-DIMENSIONAL PRINTING

(71) Applicant: Desktop Metal, Inc., Burlington, MA (US)

(72) Inventors: Alexander C. Barbati, Melrose, MA (US); George Steven Hudelson, Billerica, MA (US); Christopher Benjamin Renner, Cambridge, MA (US); Michael Andrew Gibson, Philadelphia, MA (US)

(73) Assignee: Desktop Metal, Inc., Burlington, MA (US)

( * ) Notice: Subject to any disclaimer, the term of this patent is extended or adjusted under 35 U.S.C. 154(b) by 462 days.

(21) Appl. No.: 17/151,444

(22) Filed: Jan. 18, 2021

(65) Prior Publication Data

US 2021/0237160 A1 Aug. 5, 2021

Related U.S. Application Data

(60) Provisional application No. 62/962,648, filed on Jan. 17, 2020.

(51) Int. Cl.
*B22F 10/80* (2021.01)
*B22F 10/14* (2021.01)
*B33Y 10/00* (2015.01)
*B33Y 50/00* (2015.01)

(52) U.S. Cl.
CPC .............. *B22F 10/80* (2021.01); *B22F 10/14* (2021.01); *B33Y 10/00* (2014.12); *B33Y 50/00* (2014.12)

(58) Field of Classification Search
CPC .......... B22F 10/80; B22F 10/14; B33Y 10/00; B33Y 50/00; B33Y 70/00; Y02P 10/25
See application file for complete search history.

(56) References Cited

U.S. PATENT DOCUMENTS

2019/0047047 A1* 2/2019 Mark ...................... B22F 1/142

* cited by examiner

*Primary Examiner* — Anthony M Liang  
*Assistant Examiner* — Danny N Kang  
(74) *Attorney, Agent, or Firm* — Ethos Legal, PLLC; Jonathan D. Hall

(57) ABSTRACT

A method for binder jetting a three-dimensional (3D) object includes receiving a geometry of the object to be printed and generating instructions for printing the object. Generating the instructions includes slicing the geometry of the object into a series of cross-sectional shapes corresponding to where a binder fluid will be deposited onto a powder bed to form the object, and including a plurality of negatively printed features within at least some of the series of cross-sectional shapes, wherein an amount of binder fluid to be deposited in the negatively printed features is less than an amount of binder fluid to be deposited in a remainder of the cross-sectional shape. The amount of binder fluid to be deposited in the negatively printed features and a size of the negatively printed features is configured to allow gas to escape from the powder bed.

20 Claims, 22 Drawing Sheets

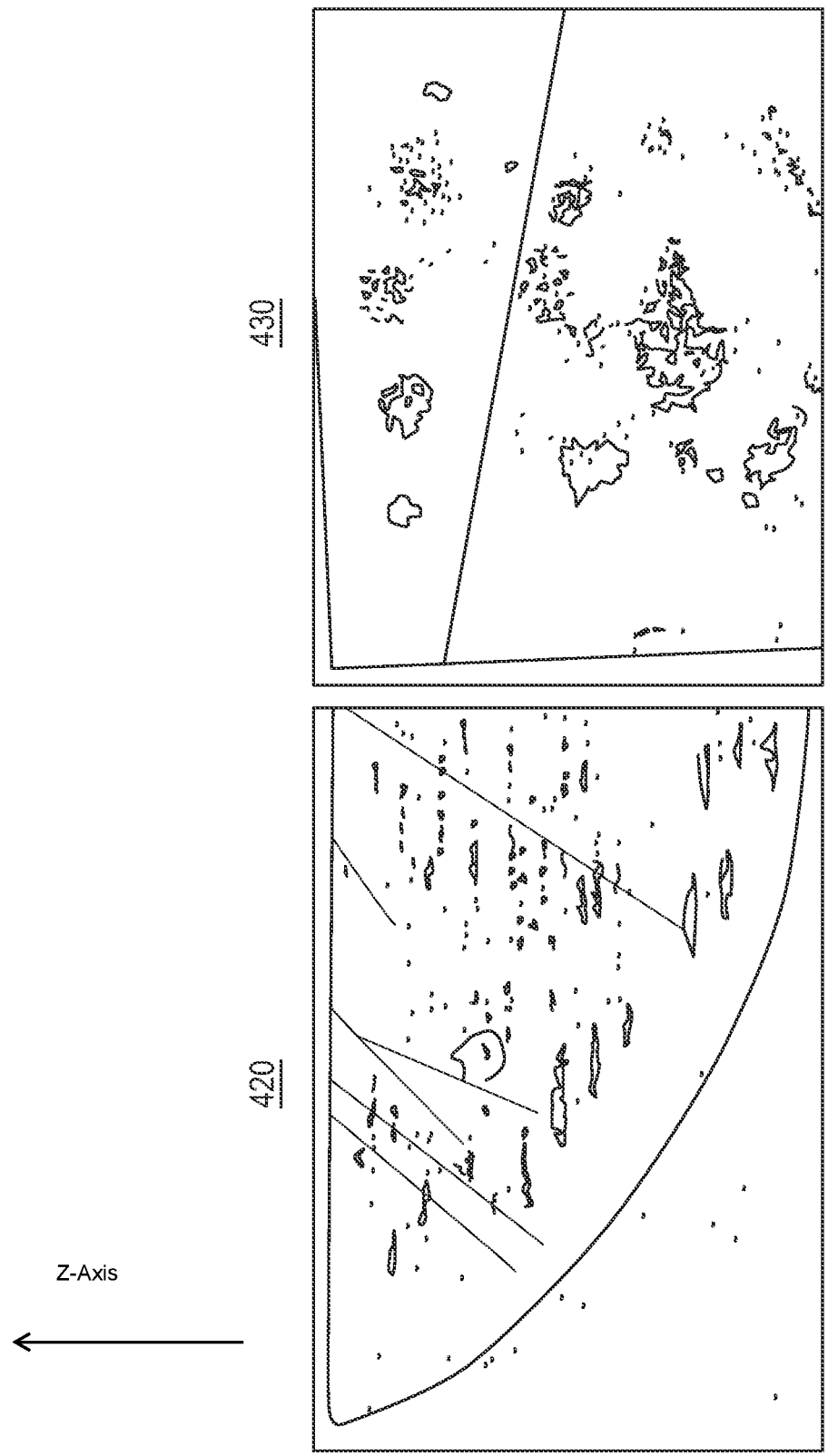

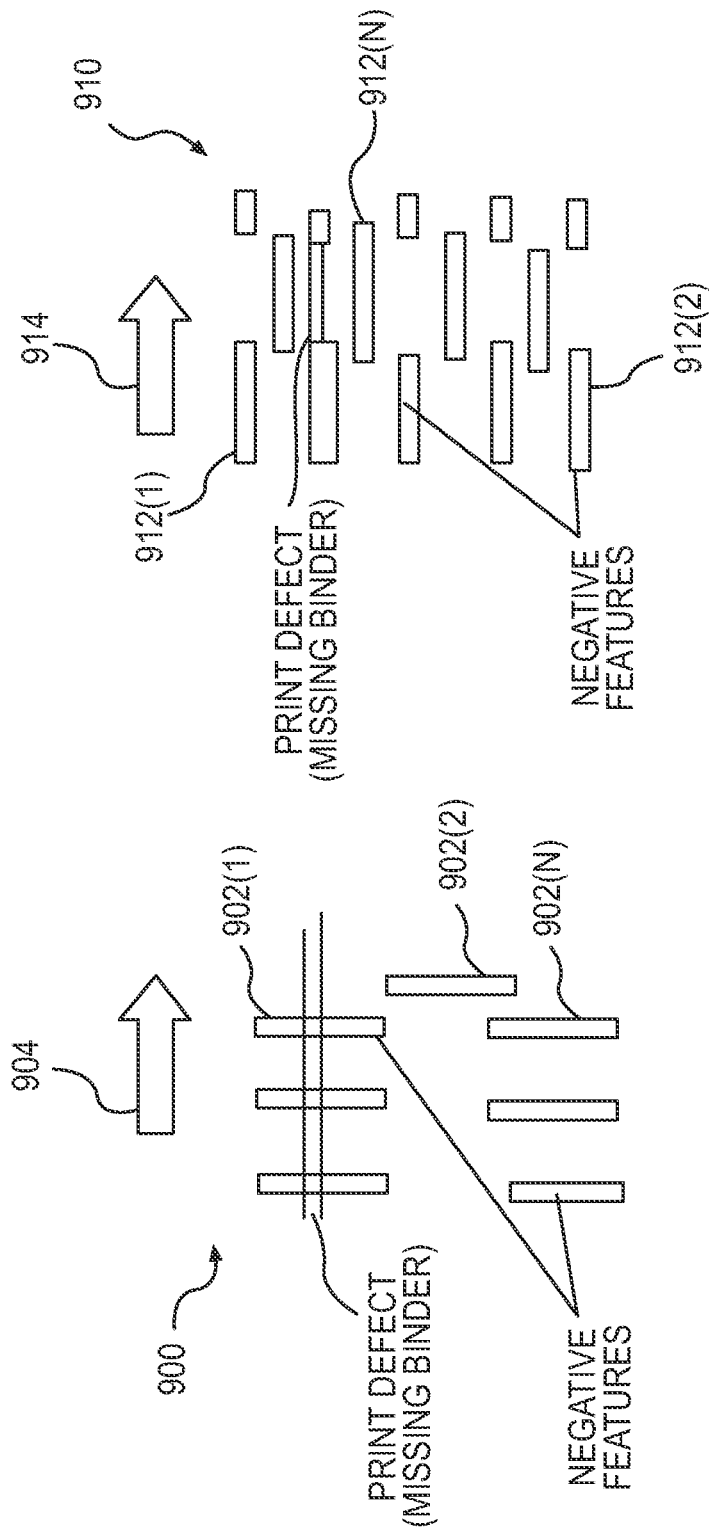

METHODS AND DEVICES FOR THREE-DIMENSIONAL PRINTING

CROSS REFERENCE TO RELATED APPLICATION

This application claims the benefit under 35 U.S.C. § 119(e) of U.S. Provisional Application No. 62/962,648 filed Jan. 17, 2020, all of which are herein incorporated by reference in their entirety.

TECHNICAL FIELD

Various aspects of the present disclosure relate generally to systems and methods for fabricating components.

BACKGROUND OF THE DISCLOSURE

Powder bed three-dimensional fabrication is an additive manufacturing technique based on bonding particles of a powder to form a three-dimensional object within the powder bed. Binder jetting is one type of powder bed three-dimensional fabrication. Binder jetting includes delivering powder, e.g., metal powder, to a powder bed, spreading the powder into a layer, and depositing a binder material, e.g., a binder fluid, on top of the powder to bind the powder together. The binder material is deposited in a pre-determined pattern (e.g., in a cross-sectional shape of the three-dimensional object) to successive layers of powder in a powder bed such that the powder particles bind to one another where the binder material is located to form a three-dimensional green part. In the context of binder jet printing of three-dimensional metal objects, a three-dimensional green part may be formed by printing as described above, and may then be processed further into a finished three-dimensional metal part. For example, excess, unbound metal powder may be removed from the powder bed. Then, the three-dimensional green part may be heated in a furnace to remove the binder material and/or sintered to form the final, three-dimensional part.

However, binder jetting thin layers of powder at high speeds may be challenging. For example, gas, which may in some embodiments be ambient air, may be entrapped within the powder bed, causing macro-porosity within printed parts. Macro-porosity within printed parts may be undesirable when parts with low porosity are desired, as in structural applications. For example, gas, e.g., gas, entrapment may occur when a rate of binder deposition onto a layer of powder material and spatial coverage of the binder on the layer of powder material traps a volume of gas below the printed binder within the layer of powder. Thus, deposition of binder at high speeds may be problematic, at least in part due to the possibility of gas entrapment.

SUMMARY OF THE DISCLOSURE

Examples of the present disclosure relate to, among other things, additive manufacturing systems and methods for forming negatively printed features, i.e., features that include regions where binder material is intentionally not deposited or is deposited in such low quantities that these regions are permeable to gas and are able to vent gas through them. In other words, the binder does not fully coalesce into a film capable of trapping gas where the negatively printed features are printed. Each of the examples disclosed herein may include one or more of the features described in connection with any of the other disclosed examples.

The present disclosure includes a method for binder jetting a three-dimensional (3D) object. The method may include receiving a geometry of the object to be printed and generating instructions for printing the object. Generating the instructions may include slicing the geometry of the object into a series of cross-sectional shapes corresponding to where a binder fluid will be deposited onto a powder bed to form the object, and including a plurality of negatively printed features within at least some of the series of cross-sectional shapes, wherein an amount of binder fluid to be deposited in the negatively printed features is less than an amount of binder fluid to be deposited in a remainder of the cross-sectional shape. The amount of binder fluid to be deposited in the negatively printed features and a size of the negatively printed features may be configured to allow gas to escape from the powder bed. The powder enclosed within the negatively printed region is nevertheless bound substantially on all sides by the remaining printed regions and remains within the part during subsequent processing. As the binder in the printed regions is debound during subsequent processing and eliminated during sintering the resulting final metal part does not include a void or "missing" powder. Rather the negatively printed regions, while sometimes detectable from visible inspection, are effectively the same as the printed regions and do not negatively impact the mechanical properties of the final part.

According to some aspects, a method for binder jetting a three-dimensional (3D) object may include depositing metal powder onto a powder bed to form a layer and depositing binder fluid on the layer to form a pattern of printed binder fluid regions and negatively printed features, wherein an amount of binder fluid to be deposited in the negatively printed features is less than an amount of binder fluid to be deposited in the printed binder fluid regions. The amount of binder fluid to be deposited in the negatively printed features may be configured to allow gas within the powder bed to escape.

According to some aspects, a method for binder jetting a three-dimensional (3D) object may include receiving a geometry of the object to be printed and generating instructions for printing the object. Generating the instructions may include slicing the geometry of the object into a series of cross-sectional shapes corresponding to where a binder fluid will be deposited on a powder bed to form the object and including a plurality of negatively printed features within at least some of the series of cross-sectional shapes. An amount of binder fluid to be deposited in the negatively printed features may be configured to allow gas to escape from the powder bed. Additionally, at least one of (i) a size of the negatively printed features in each cross-sectional shape or (ii) a number of the negatively printed features in each cross-sectional shape may depend at least in part on whether the cross-sectional shape corresponds to an upper region or a lower region of the object.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges)

may have a variation of +/−10% (unless a different variation is specified) from the disclosed numeric value. In this disclosure, unless stated otherwise, relative terms, such as, for example, "about," "substantially," and "approximately" are used to indicate a possible variation of +/−10% in the stated value. Moreover, in the claims, values, limits, and/or ranges of various claimed elements and/or features means the stated value, limit, and/or range+/−10%. The terms "object," "part," and "component," as used herein, are intended to encompass any object fabricated through the additive manufacturing techniques described herein, and the terms are used herein interchangeably.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure.

FIGS. 4A, 4B, and 4C show example surface defects present on a print surface.

FIGS. 9A and 9B show example alignments of the negative features relative to print direction.

DETAILED DESCRIPTION

Embodiments of the present disclosure include systems and methods to facilitate and improve the efficacy and efficiency of additive manufacturing, and, in particular, to mitigate gas entrapment issues in high-speed printing. Reference now will be made in detail to examples of the present disclosure described above and illustrated in the accompanying drawings. Wherever possible, the same reference numbers will be used throughout the drawings to refer to the same or like parts.

Figure 1A:
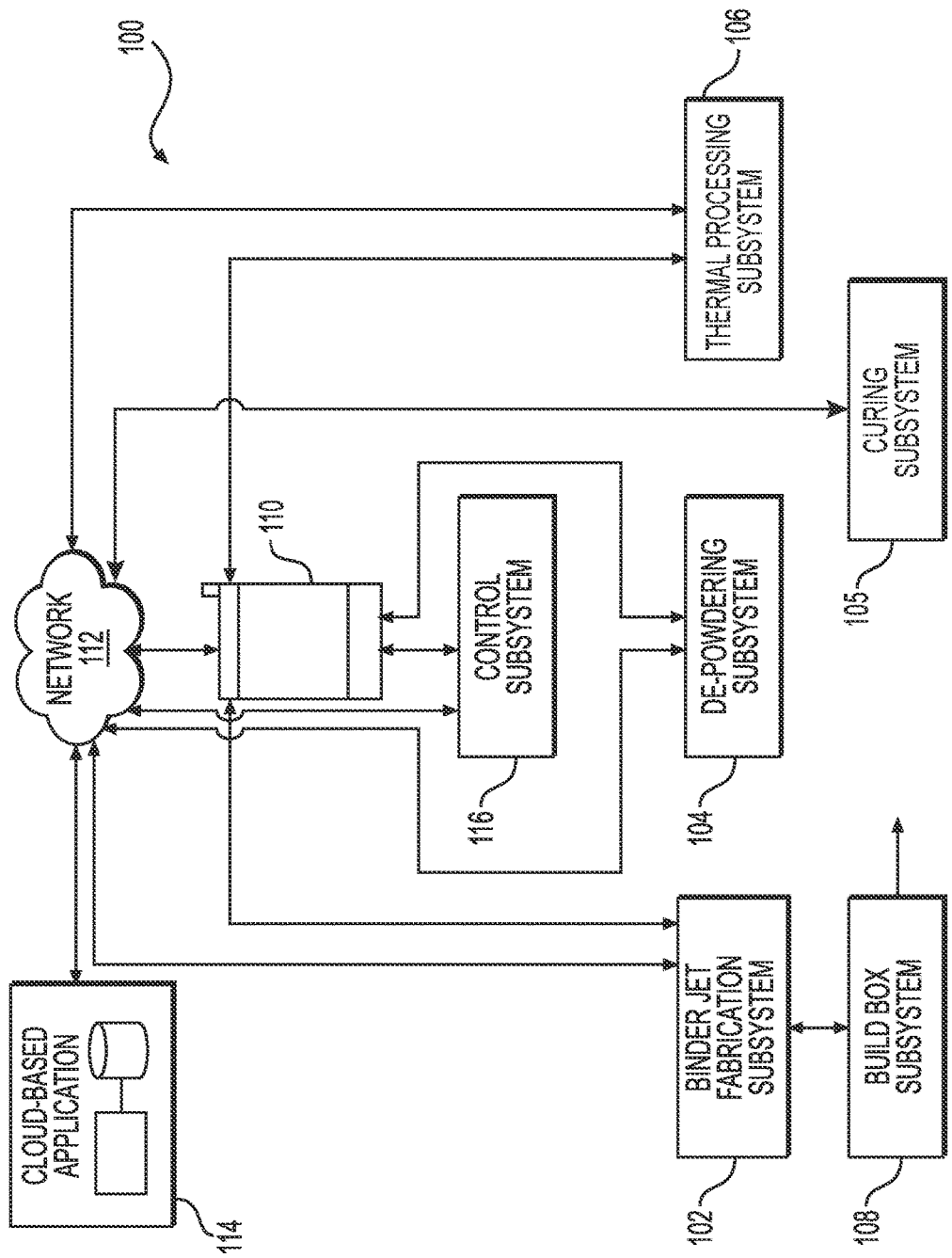
FIG. 1A is an example block diagram of an additive manufacturing system.

FIG. 1A illustrates an exemplary system 100 for forming a printed object, according to an embodiment of the present disclosure. System 100 may include a printer, for example, a binder jet fabrication subsystem 102, and a treatment site(s), for example, a de-powdering subsystem 104, curing subsystem 105, and a thermal processing subsystem 106 that may perform drying, thermally-debinding and/or sintering functions. These functions may be performed in a single furnace, or in a plurality of furnaces (e.g., two or three furnaces). In one aspect, curing subsystem 105 may perform a curing step following the binder jet fabrication or printing and before a depowdering step. Binder jet fabrication subsystem 102 may be used to form an object from a build material, for example, by delivering successive layers of build material and binder material to a build plate. As shown in FIG. 1A, a build box subsystem 108 may be movable and may be selectively positioned in one or more of binder jet fabrication subsystem 102, de-powdering subsystem 104, curing subsystem 105, and thermal processing subsystem 106. For example, build box subsystem 108 may be coupled or couplable to a movable assembly. Alternatively, a conveyor (not shown) may help transport the object between portions of system 100.

The build material may be a bulk metallic powder delivered and spread in successive layers. The binder material may be, for example, a polymer-containing liquid that may be deposited onto and may be absorbed into layers of the build material. One or more of binder jet fabrication subsystem 102, de-powdering subsystem 104, curing subsystem 105, and thermal processing subsystem 106 may include a debinding station to treat the printed object to remove a binder material from the build material. Thermal processing subsystem 106 may heat and/or sinter the build material of the printed object. System 100 may also include a user interface 110, which may be operatively coupled to one or more components, for example, to binder jet fabrication subsystem 102, de-powdering subsystem 104, curing subsystem 105, and thermal processing subsystem 106, etc. In some embodiments, user interface 110 may be a remote device (e.g., a computer, a tablet, a smartphone, a laptop, etc.). User interface 110 may be wired or wirelessly connected to one or more of binder jet fabrication subsystem 102, de-powdering subsystem 104, curing subsystem 105, and thermal processing subsystem 106. System 100 may also include a control subsystem 116, which may be included in user interface 110, or may be a separate element.

Binder jet fabrication subsystem 102, de-powdering subsystem 104, thermal processing subsystem 106, user interface 110, and/or control subsystem 116 may each be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., geometries, the printing material, one or more support and/or support interface details, binder materials, heating and/or sintering times and temperatures, etc., for a part or a part to be printed.

Moreover, network 112 may be connected to a cloud-based application 114, which may also provide a data transfer connection between the various components and cloud-based application 114 in order to provide a data transfer connection, as discussed above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage and/or processing device within or operably coupled to one or more of binder jet fabrication subsystem 102, de-powdering subsystem 104, curing subsystem 105, thermal processing subsystem 106, user interface 110, and/or control subsystem 116. In this aspect, binder jet fabrication subsystem 102, de-powdering subsystem 104, curing subsystem 105, thermal processing subsystem 106, user interface 110, and/or control subsystem 116 may be disconnected from the Internet and/or other networks, which may increase security protections for the components of system 100. In either aspect, an additional controller (not shown) may be associated with one or more of binder jet fabrication subsystem 102, de-powdering subsystem 104, and thermal processing subsystem 106, etc., and may be configured to receive instructions to form the printed object and to instruct one or more components of system 100 to form the printed object.

Figure 1B:
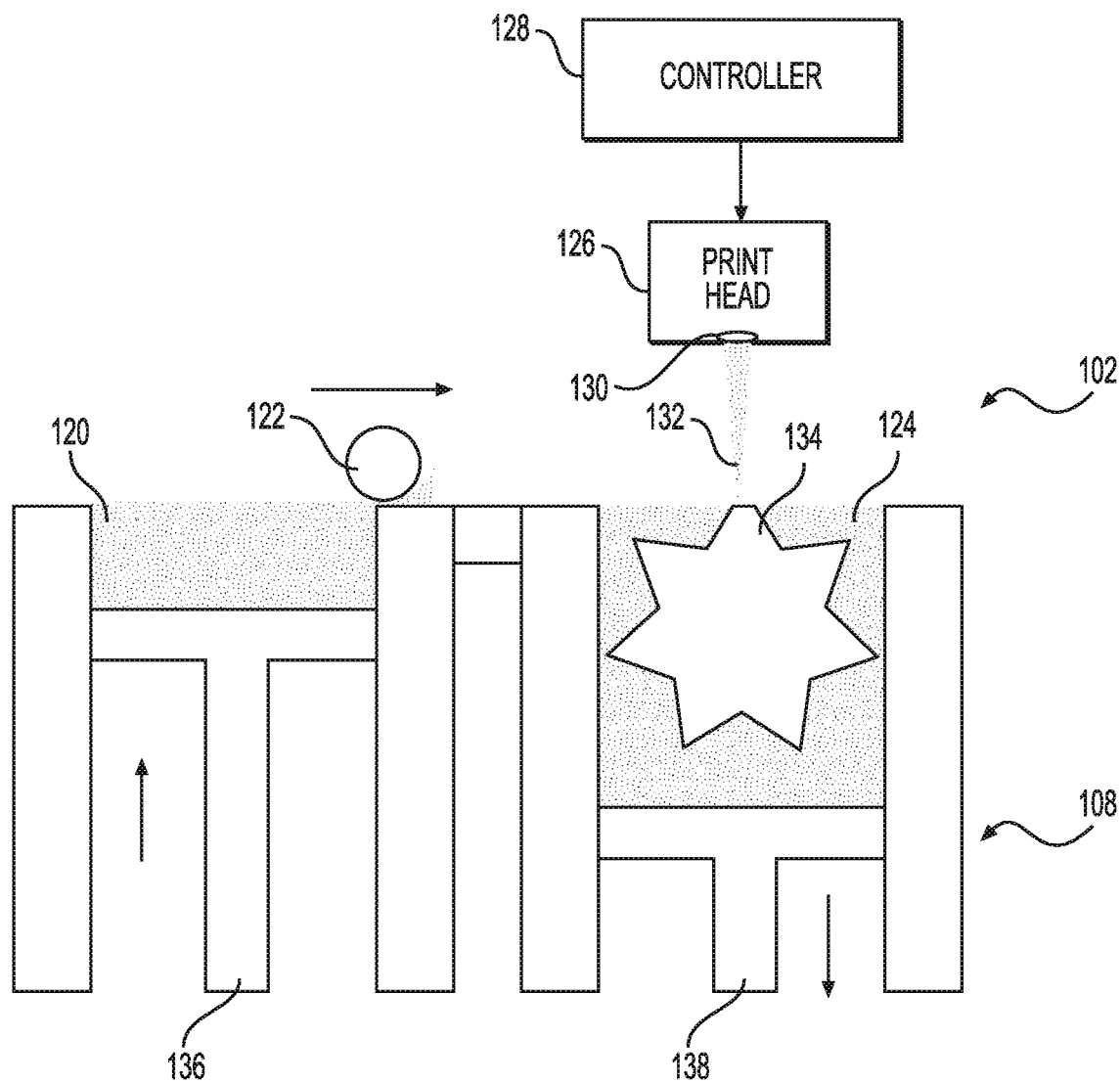
FIG. 1B illustrates an example fabrication subsystem.

FIG. 1B illustrates an exemplary binder jet fabrication subsystem 102 operating in conjunction with build box subsystem 108. Binder jet fabrication subsystem 102 may include a powder supply 120, a spreader 122 (e.g., a roller) configured to be movable across powder bed 124 of build box subsystem 108, a print head 126 movable across powder bed 124, and a controller 128 in electrical communication (e.g., wireless, wired, Bluetooth, etc.) with print head 126. Powder bed 124 may comprise powder particles, for example, micro-particles of a metal, micro-particles of two or more metals, or a composite of one or more metals and other materials.

Spreader 122 may be movable across powder bed 124 to spread a layer of powder, from powder supply 120, across powder bed 124. Print head 126 may comprise a discharge orifice 130 and, in certain implementations, may be actuated to dispense a binder material 132 (e.g., through delivery of an electric current to a piezoelectric element in mechanical communication with binder material 132) through discharge orifice 130 to the layer of powder spread across powder bed 124. In some embodiments, the binder material 132 may be one or more fluids configured to bind together powder particles.

In operation, controller 128 may actuate print head 126 to deliver binder material 132 from print head 126 to each layer of the powder in a pre-determined two-dimensional pattern, as print head 126 moves across powder bed 124. In embodiments, the movement of print head 126, and the actuation of print head 126 to deliver binder material 132, may be coordinated with movement of spreader 122 across powder bed 124. For example, spreader 122 may spread a layer of the powder across powder bed 124, and print head 126 may deliver the binder in a pre-determined, two-dimensional pattern, to the layer of the powder spread across powder bed 124, to form a layer of one or more three-dimensional objects 134. These steps may be repeated (e.g., with the pre-determined two-dimensional pattern for each respective layer) in sequence to form subsequent layers until, ultimately, the one or more three-dimensional objects 134 are formed in powder bed 124.

Although the example embodiment depicted in FIG. 1B depicts a single object 134 being printed, it should be understood that the powder bed 124 may include more than one object 134 in embodiments in which more than one object 134 is printed at once. Further, the powder bed 124 may be delineated into two or more layers, stacked vertically, with one or more objects disposed within each layer.

An example binder jet fabrication subsystem 102 may comprise a powder supply actuator mechanism 136 that elevates powder supply 120 as spreader 122 layers the powder across powder bed 124. Similarly, build box subsystem 108 may comprise a build box actuator mechanism 138 that lowers powder bed 124 incrementally as each layer of powder is distributed across powder bed 124.

In another example embodiment, layers of powder may be applied to powder bed 124 by a hopper followed by a compaction roller. The hopper may move across powder bed 124, depositing powder along the way. The compaction roller may be configured to follow the hopper, spreading the deposited powder to form a layer of powder.

Figure 1C:
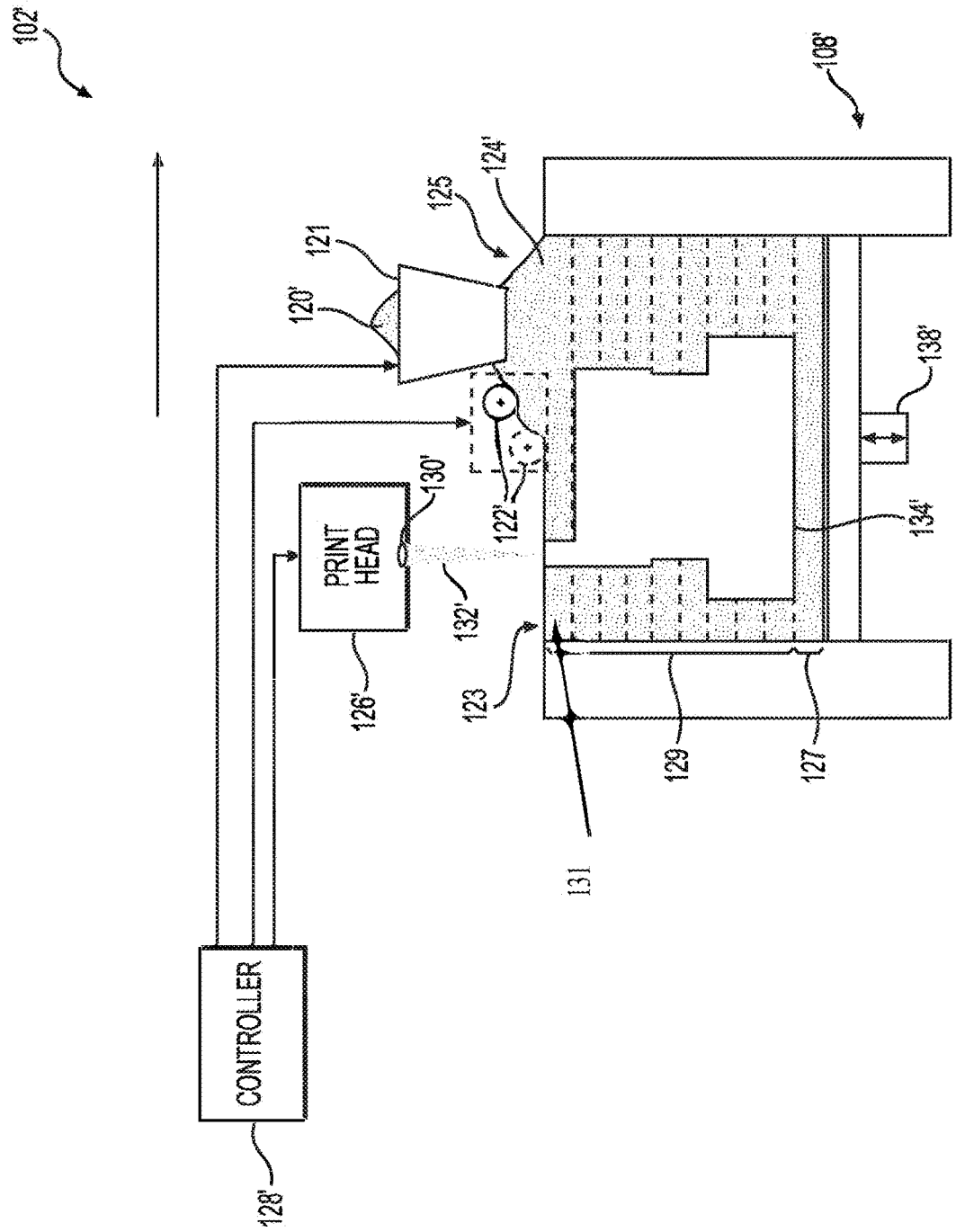
FIG. 1C illustrates another example fabrication subsystem, according to aspects of the present disclosure.

For example, FIG. 1C illustrates another binder jet fabrication subsystem 102' operating in conjunction with a build box subsystem 108'. In this aspect, binder jet fabrication subsystem 102' may include a powder supply 120' in a metering apparatus, for example, a hopper 121. Binder jet subsystem 102' may also include one or more spreaders 122' (e.g., one or more rollers) configured to be movable across powder bed 124' of build box subsystem 108', a print head 126' movable across powder bed 124', and a controller 128' in electrical communication (e.g., wireless, wired, Bluetooth, etc.) with one or more of hopper 121, spreaders 122', and print head 126'. Powder bed 124' may comprise powder particles, for example, micro-particles of a metal, micro-particles of two or more metals, or a composite of one or more metals and other materials.

Hopper 121 may be any suitable metering apparatus configured to meter and/or deliver powder from powder supply 120' onto a top surface 123 of powder bed 124'. Hopper 121 may be movable across powder bed 124' to deliver powder from powder supply 120' onto top surface 123. The delivered powder may form a pile 125 of powder on top surface 123.

The one or more spreaders 122' may be movable across powder bed 124' downstream of hopper 121 to spread powder, e.g., from pile 125, across powder bed 124. The one or more spreaders 122' may also compact the powder on top surface 123. In either aspect, the one or more spreaders 122' may form a new layer 131 of powder. The aforementioned powder delivery and spreading steps may be successively performed in order to form a plurality of layers 129 of powder. Additionally, although two spreaders 122' are shown in FIG. 1C, binder jet fabrication subsystem 102' may include one, three, four, etc. spreaders 122'.

Print head 126' may comprise a discharge orifice 130' and, in certain implementations, may be actuated to dispense a binder material 132' (e.g., through delivery of an electric current to a piezoelectric element in mechanical communication with binder material 132') through discharge orifice 130' to the layer of powder spread across powder bed 124'. In some embodiments, the binder material 132' may be one or more fluids configured to bind together powder particles.

In operation, controller 128' may actuate print head 126' to deliver binder material 132' from print head 126' to each layer 127 of the powder in a pre-determined two-dimensional pattern, as print head 126' moves across powder bed 124'. As shown in FIG. 1C, controller 128' may be in communication with hopper 121 and/or the one or more spreaders 122' as well, for example, to actuate the movement of hopper 121 and the one or more spreaders 122' across powder bed 124'. Additionally, controller 128' may control the metering and/or delivery of powder by hopper 121 from powder supply 120 to top surface 123 of powder bed 124'. In embodiments, the movement of print head 126', and the actuation of print head 126' to deliver binder material 132', may be coordinated with movement of hopper 121 and the one or more spreaders 122' across powder bed 124'. For example, hopper 121 may deliver powder to powder bed 124, and spreader 122' may spread a layer of the powder across powder bed 124. Then, print head 126 may deliver the binder in a pre-determined, two-dimensional pattern, to the layer of the powder spread across powder bed 124', to form a layer of one or more three-dimensional objects 134'. These steps may be repeated (e.g., with the pre-determined two-dimensional pattern for each respective layer) in sequence to form subsequent layers until, ultimately, the one or more three-dimensional objects 134' are formed in powder bed 124'.

Although the example embodiment depicted in FIG. 1C depicts a single object 134' being printed, it should be understood that the powder bed 124' may include more than one object 134' in embodiments in which more than one object 134' is printed at once. Further, the powder bed 124' may be delineated into two or more layers of parts 129, stacked vertically, with one or more objects disposed within each layer.

As in FIG. 1B, build box subsystem 108' may comprise a build box actuator mechanism 138' that lowers powder bed 124' incrementally as each layer 127 of powder is distributed across powder bed 124'. Accordingly, hopper 121, the one or more spreaders 122', and print head 126' may traverse build box subsystem 108' at a pre-determined height, and build box actuator mechanism 138' may lower powder bed 124 to form object 134'.

Although not shown, binder jet fabrication subsystems 102, 102' may include a coupling interface that may facilitate the coupling and/or uncoupling of the build box subsystems 108, 108' with the binder jet fabrication subsystems 102, 102', respectively. The coupling interface may comprise one or more of (i) a mechanical aspect that provides for physical engagement, and/or (ii) an electrical aspect that supports electrical communication between the build box subsystem 108, 108' to the binder jet fabrication subsystem 102, 102'.

Binder jet fabrication subsystems 102, 102' may be configured to form layers of metal powder and deposit binder material, e.g., binder fluid, at high speeds in order to achieve high-speed printing of metal parts. For example, binder jet fabrication subsystems 102, 102' may be capable of per-layer print times within the range of about 1 minute to about 2 seconds and layer heights within the range of about 50 to about 200 microns. Higher speed printing may be considered printing speeds of 10 seconds per layer and below, with high-speed printing averaging about 2-6 second per layer. Binder jetting thin layers of powders at high speeds, however, may lead to entrapment of gas within the powder bed (e.g., powder bed 124/124' described above, hereafter collectively referred to as powder bed 124) when binder material is applied to the powder bed. This may cause macro-porosity and/or defects within printed parts. For example, gas entrapment may result when a rate of deposition of binder material (e.g., binder material 132/132') and spatial coverage of the binder material across the powder bed traps gas within the powder bed that is unable to escape due to the printed binder now covering the layer of powder. The speed with which the binder material imbibes into the powder bed may be slower than the rate at which the binder material is deposited across the bed, which may, in some circumstances, result in the trapping of the gas atmosphere beneath the imbibing fluid. A number of characteristics of binder jet fabrication subsystems 102/102' may make deposition of binder material at high speeds more or less prone to defects due to trapped gas, including, e.g., the size of the printed region, the height of the spread layer upon which the binder material is deposited, the particle size distribution or other properties of the powder being spread, the viscosities of the escaping gas and binder material, the deposition rate of binder material, the surface tension of binder material, the contact angle between the binder material and powder, and the flow resistance properties of the powder bed in the direction of binder transport and the direction of gas transport. A flow resistance property in this context refers to a resistance of a medium with respect to the transport of a fluid. Embodiments of the disclosure may be designed to allow gas to vent or escape from the powder bed before binder material is able to entrap the gas within the powder bed 124. This may involve an interplay between the resistance of the powder bed 124 with respect to transport of gas and the transport of fluid. In at least some embodiments of the present disclosure, gas entrapment may be permitted. However, this permitted gas entrapment may occur at a sufficiently fine lengthscale or shape such that macroscopic defects are substantially avoided or mitigated within the printed part despite the fact that some gas entrapment may occur.

Printing at conditions that necessitate less binder material deposition per unit of time (i.e., slower speeds and smaller layer heights) may mitigate gas entrapment and the formation of macro-porosity. However, this may be undesirable from a performance standpoint, because smaller layers and slower speeds may slow the overall print time required to form an object.

During binder jetting, as binder material is deposited (e.g., as print head 126/126' deposits binder material 132/132'), it absorbs into the powder bed while simultaneously displacing gas that exists in the interstitial areas between powder particles in the powder bed. When binder jetting large parts at increased print speeds (e.g., print speeds at or greater than 0.5 meters per second) onto layers of powder having heights that are small relative to the in-plane dimensions of the printed layers, a competition may exist between the imbibition of binder everywhere in the layer and the evacuation of gas that permits the binder to imbibe. During successful printing operations, the binder material moves into the powder bed and displaces gas, which escapes at the boundary of the part (i.e., where the binder is not present and where the gas can escape through the loose powder). During unsuccessful printing operations (e.g., typically where a part dimension is large as compared to the layer height and the binder is deposited faster than gas is able to escape the powder bed), gas may be trapped at the interior of the part below the binder and may subsequently be pushed (e.g., by buoyancy of the gas) toward the top surface of the part. In other words, high-speed deposition of binder material may result in a film of binder that traps gas in the interstitial areas of the powder bed faster than the fluid is absorbed in the powder bed.

High-speed deposition may create gas-filled flaws that may appear like "blisters" in layers of the printed part. These gas-filled or blister-like flaws are present during printing, but may also remain as voids in the finished part, e.g., even after debinding and sintering the printed part. The voids in the part caused by the "blisters" may be relatively large (e.g., several hundred microns in diameter), may have sharp corners, and may have a detrimental influence on the physical properties of the finalized part. For example, they may lead to failure of a part at a lower level of applied force during tensile testing, or may lead to a part failing during tensile testing at a lower elongation, or other similar types of premature failure relative to a sample which does not contain a blister. Thus, there is a desire to develop methods that enable more binder material to be deposited per unit of time and area to enable high-speed printing while also mitigating or eliminating the presence of blistering. One or more aspects of this disclosure may address at least one of the above issues or related issues.

In exemplary embodiments, binder may be deposited so as to include negatively printed features (e.g., places where binder material is intentionally not deposited or is deposited in amounts such that the powder does not fully coalesce and where the powder-binder composite remains effectively permeable to gas) to provide vent regions within the binder-deposition area where gas may escape from the powder bed as the binder is deposited on a layer to form a part. The negatively printed features, also referred to as gas permeable regions or gas permeable printed regions, are formed by depositing an amount of binder fluid that is less than an amount of binder fluid deposited in a remainder of the cross-sectional shape of the part printed in a given layer to allow gas to vent through the negatively printed features. Portions of the negatively printed features, which form effectively permeable regions, may exhibit reduced permeability to gas, but may not become impermeable to gas. The permeability of the negatively printed features where no binder fluid or where less binder fluid is printed may allow for the escape of gas from within the powder bed. Accordingly, by designing pre-determined escape regions, the escape of gas from the powder bed may be better controlled, and the creation of defects within the part caused by trapped gas may be mitigated or avoided completely. In some embodiments, negatively printed features within a powder layer (e.g., a metal powder layer) may have one or more of the following properties: large perimeters per area; minimum in-plane dimensions at or slightly exceeding a length at which the powder bed will spontaneously wet or spread through an un-printed region; orientations that are at least partially offset relative to (at least) orientations of the negatively printed features within the immediately prior powder layer; shapes both in-plane and out-of-plane that reduce stress concentrations and thus maximize strength of the printed parts after crosslinking; and/or major axes parallel or antiparallel with the direction of print. These properties of negatively printed features are described in more detail herein. While the negative features contain reduced or no binder, and thus contain loose powder, they are substantially or entirely surrounded by binder regions, and thus are "locked" internally to the green part. During debinding and sintering, the binder printed regions are debound and thus sinter along with the loose powder of the negatively printed features. This results in little if any detectable difference between the negatively printed features and the binder printed features in the final part. Thus the negative features do not negatively impact the mechanical properties of the final parts.

Figure 2:
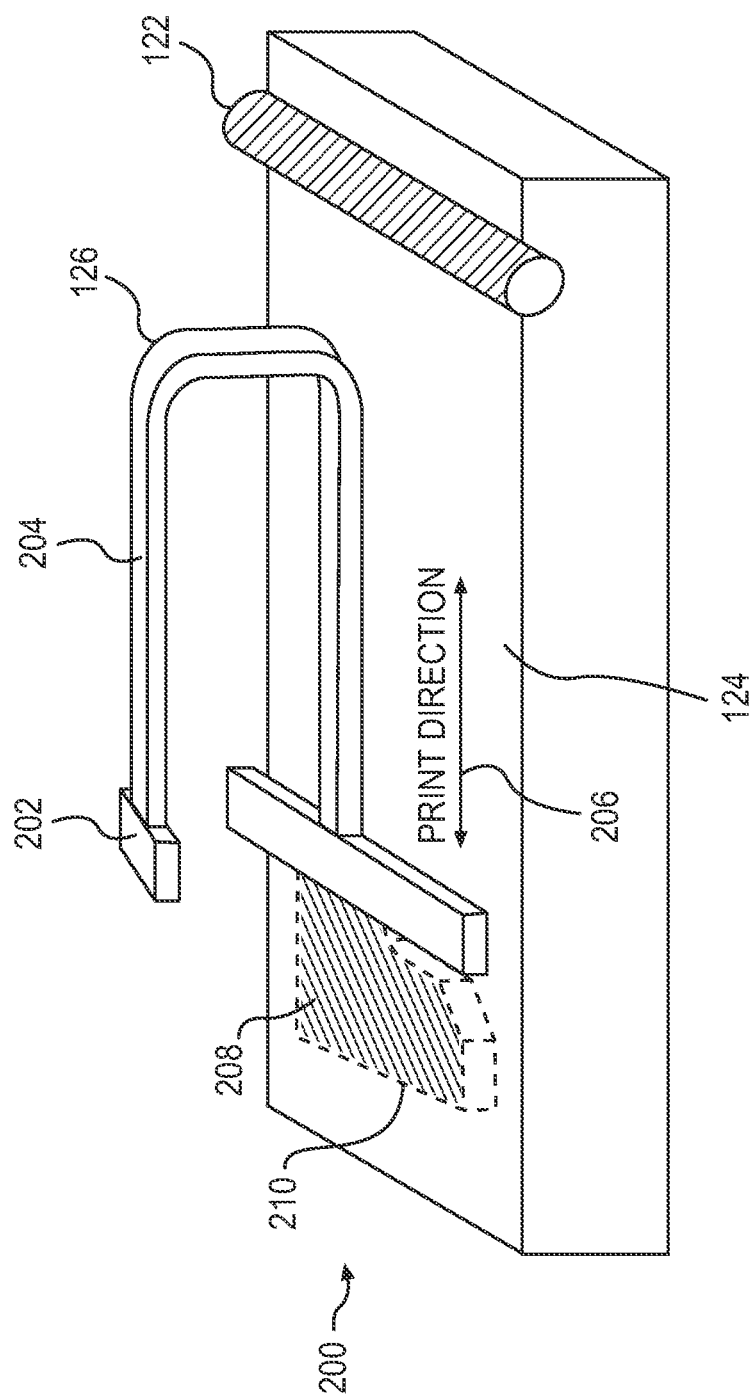
FIG. 2 is an example schematic diagram of a printing head with a powder bed/build volume.

Reference is now made to FIG. 2, which shows an example schematic diagram 200 of the print head 126 with powder bed 124. FIG. 2 also shows the spreader 122. The print head 126, powder bed 124, and spreader 122 operate as described above in connection with FIGS. 1A-1C. As shown in FIG. 2, the print head 126 may interact with a binder supply system comprising a binder supply 202 and a drag chain 204. The binder supply system may include a recirculation system including one or more pumps, valves, pressure measurement sensors, binder reservoirs, etc. The print head 126 is configured to move along the surface of the powder bed 124, in the direction represented by double-sided arrow 206 in FIG. 2. During movement of print head 126, controller 128, may issue commands to print head 126 to jet binder material 132 at appropriate timing(s) based on the desired image and positional feedback information. Reference numeral 208 shows a geometry of a last printed layer of the powder bed 124 with an outline of the printed part where binder was deposited shown at reference numeral 210.

As stated above, embodiments of the present disclosure are drawn to the generation of negative features (e.g., unprinted portions where no binder is deposited) within one or more layers of a binder-jetted part. In one aspect, one negative feature or a group of negative features (also referred to as gas permeable printed regions) may form a vent region to facilitate the escape of gas. The features could be used in all, some, or none of the printed part layers, depending upon the part geometry and other features of the printing process (including, for example, layer height, spatial extent of the geometry printed in a given pass, and/or print speed, among others). The orientation and geometry of these negative features may be designed to allow gas to escape from the powder bed on which the binder is printed.

In some aspects, the spacing between negatively printed features within a layer may be determined based upon print conditions, properties of the powder bed 124, and/or properties of the binder material. For example, the appearance of macropores within a part may be somewhat periodic with a characteristic spatial period. This may suggest that while the imbibition of liquid binder and gas escapement competition starts the formation of a printing flaw (e.g., "blisters"), a gravity vs. surface tension instability may also play a role in the formation of flaws. The characteristic spatial period for this instability can be estimated by the formula:

$$2\pi \sqrt{\frac{\text{Surface Tension}}{\text{Density} \times \text{Gravitational Acceleration}}}.$$

In an embodiment, this estimated characteristic spatial period may be used to determine a spacing between negatively printed features within a layer. In one example, the characteristic spatial period is about 9 to 12 millimeters (mm) for the materials, such as sinterable fine metal powders used in binder jetting with inkjettable fluids. For example, the surface tension of the binder fluid may be in the range of about 30 mN/m to about 50 mN/m, about 50 mN/m to about 80 mN/m, or about 10 mN/m to about 30 mN/m. The viscosity may range from one tenth of the value of water to ten times the value of water, and may, in at least some embodiments, reach 50 times the viscosity of water. The density of the binder fluid may be in the range of about 0.9 g/cc to about 1.2 g/cc, or in some embodiments, up to 1.5 g/cc. The range of these values may depend upon the base fluid (e.g., water, alcohol, oil, or the like), additives (e.g., salts, pH modifiers, surfactants, humectants, etc.), pigments, or polymeric materials used. For at least some embodiments, the formula provided in this paragraph and associated with the spatial period of the instability may be an estimate. For example, this estimate may become less accurate when the spacing between the powder particles becomes comparable to the spatial period of the estimated instability, or when the thickness of the powder layer becomes very large or very small as compared to the spatial period of the instability. Further, the estimation may require that the transport of the fluid is dominated by viscosity, which may not be true at all times and/or for all print conditions. In practice, there may be a minimum amount of spacing between negatively printed features within a layer, depending on, e.g., the printing characteristics or the type of powder or the type of binder used.

Figure 3A:
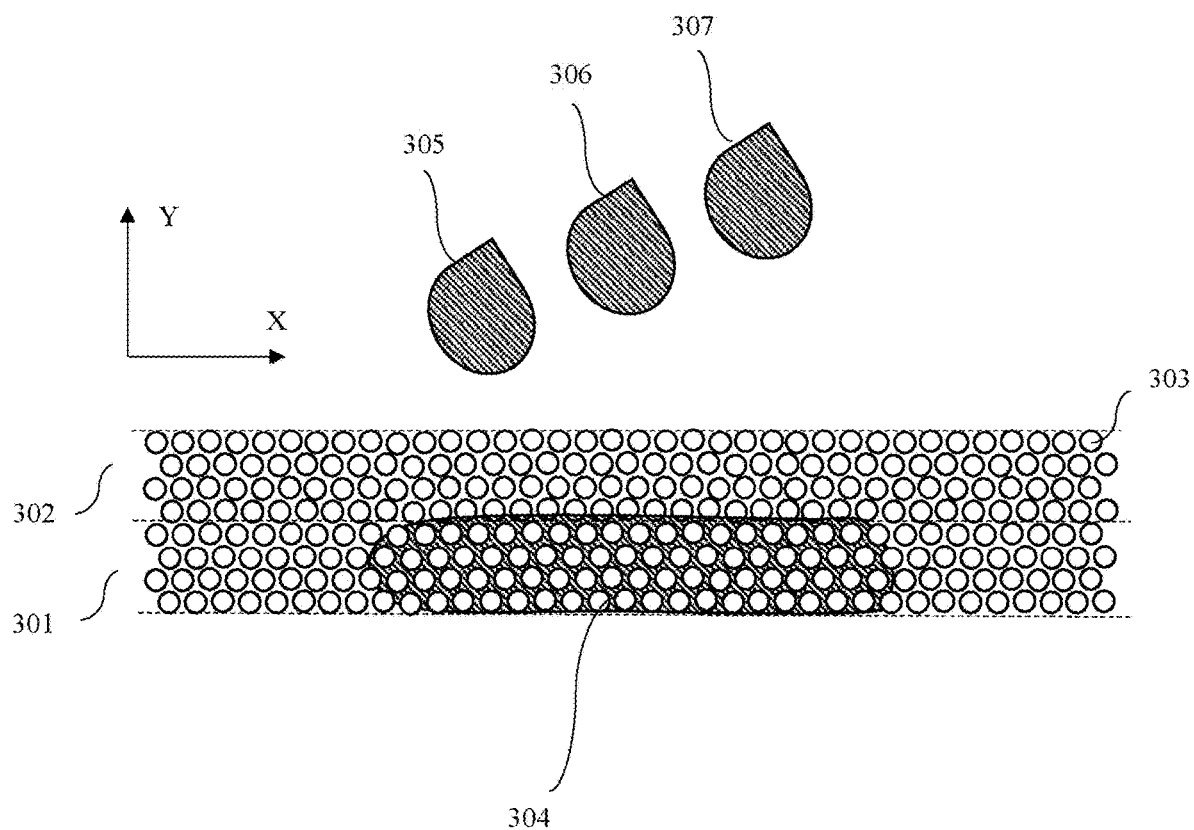
FIGS. 3A-3F depict example cross sections of a printed part at various stages during printing and binder deposition.
Figure 3B:
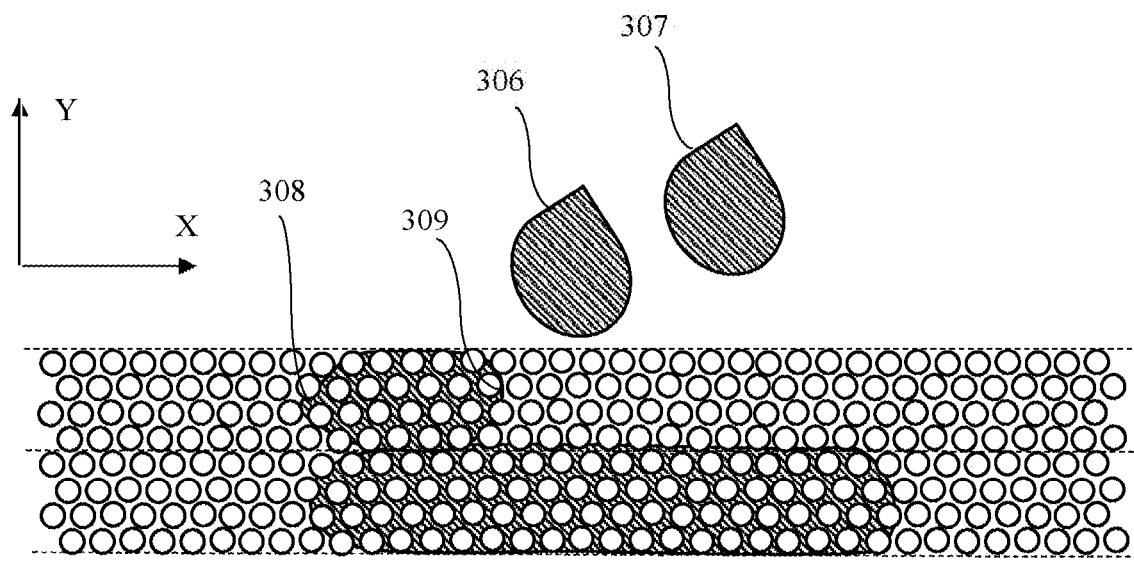
Figure 3C:
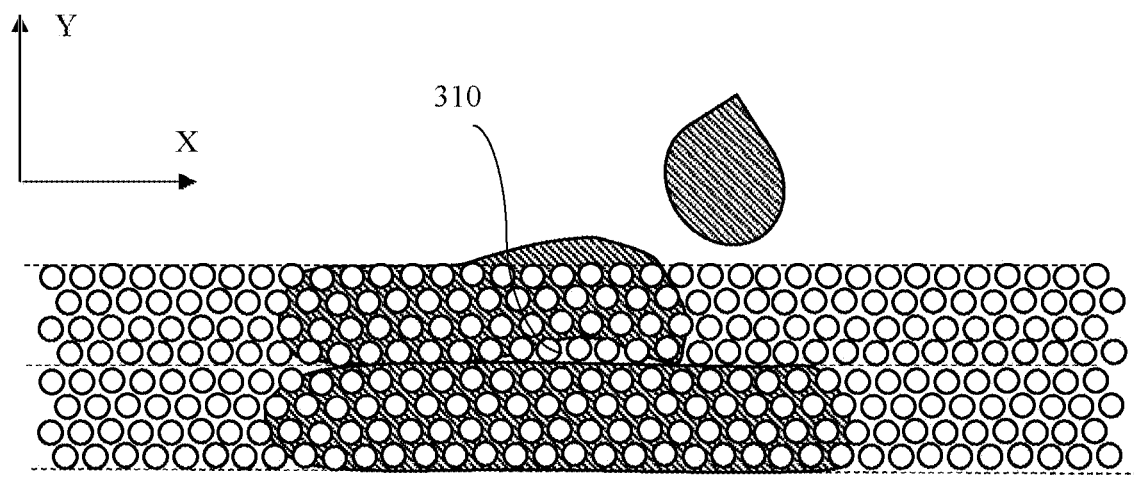
Figure 3D:
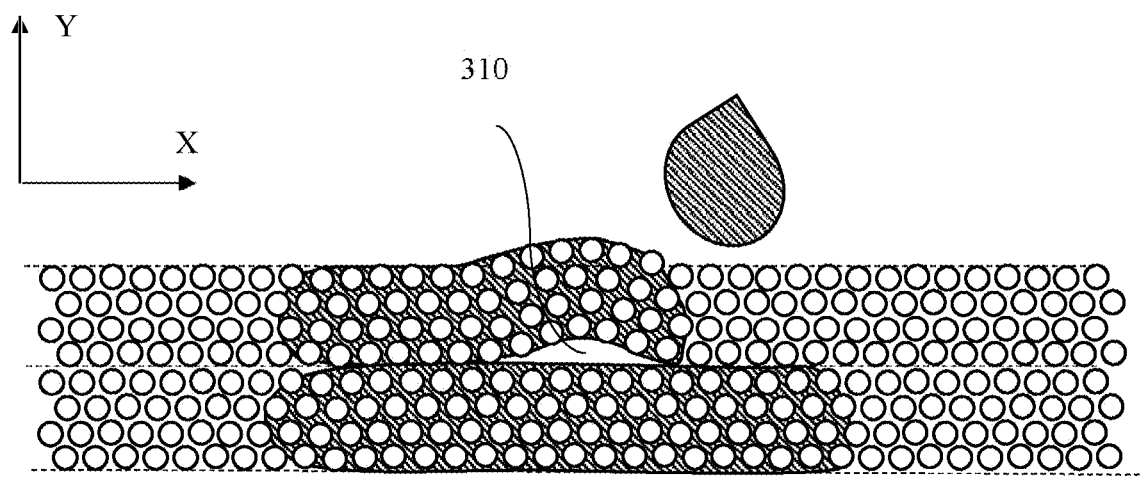
Figure 3E:
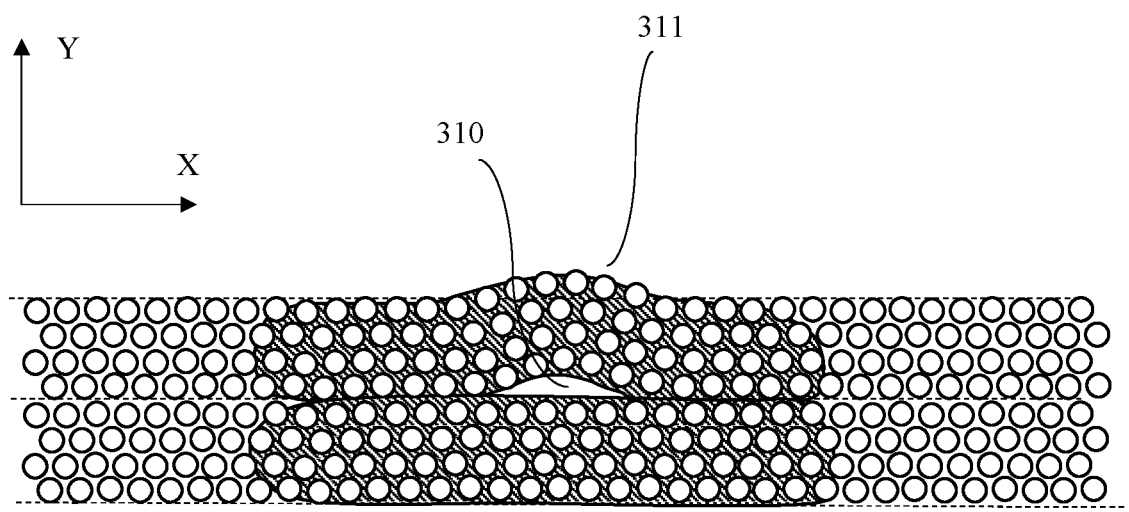
Figure 3F:
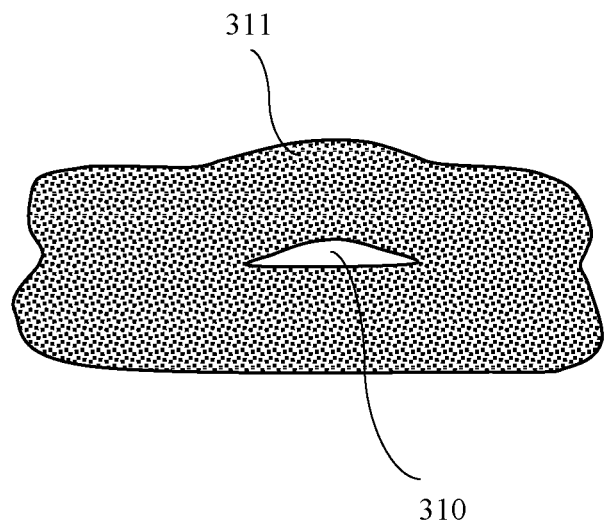

FIGS. 3A-3E show cross-sections of a part being printed at various stages during a single pass of binder deposition on powder bed and the formation of defects within the part. FIG. 3A shows a first powder layer 301 and a second, subsequent powder layer 302, each formed from deposited powder particles 303. In the Figure, first powder layer 301 has had binder deposited to form a first part layer 304. Binder droplets 305, 306 have been released from the print head but have yet to impact the second layer of powder 302. It should be understood that the powder, layer height, binder droplets are not to scale but sized in the figures to best explain the blistering phenomenon. As seen in FIG. 3B, as the first binder droplet 305 impacts the second layer of powder 302, it attempts to flow to sides 308 and 309, displacing the gas previously occupying the space between the powder particles 303. As shown in FIG. 3C, when printing at high speeds the second droplet 306 drops onto the second layer of powder before the gas displaced from the first droplet 305 can fully escape. This is because the gas being displaced must travel in the XY plane a greater distance than the height the powder layers in Z-direction. As seen in FIG. 3C, the result is an encapsulated gas pocket 310. As shown in FIG. 3D in certain cases the gas residing below the binder filled region may further undergo a capillary or surface tension driven rearrangement, resulting in regions containing only gas and substantially devoid of powder, the powder having displaced to the binder fluid. With reference to FIG. 3E, the encapsulated gas pocket 310 remains once the green part is finished. The encapsulated gas pocket 310 may also causes a raised profile 311 on the surface of the green part. As seen in FIG. 3F, once sintered these defects remain in the final sintered part and can negatively impact both surface quality and mechanical properties of the part.

This above described process may be similar to a Rayleigh-Taylor instability for stratified fluids, which is described in "Hydrodynamic and Hydromagnetic Stability" by S. Chandrasekhar (pp. 428-480), which is incorporated by reference in its entirety.

Figure 4A:
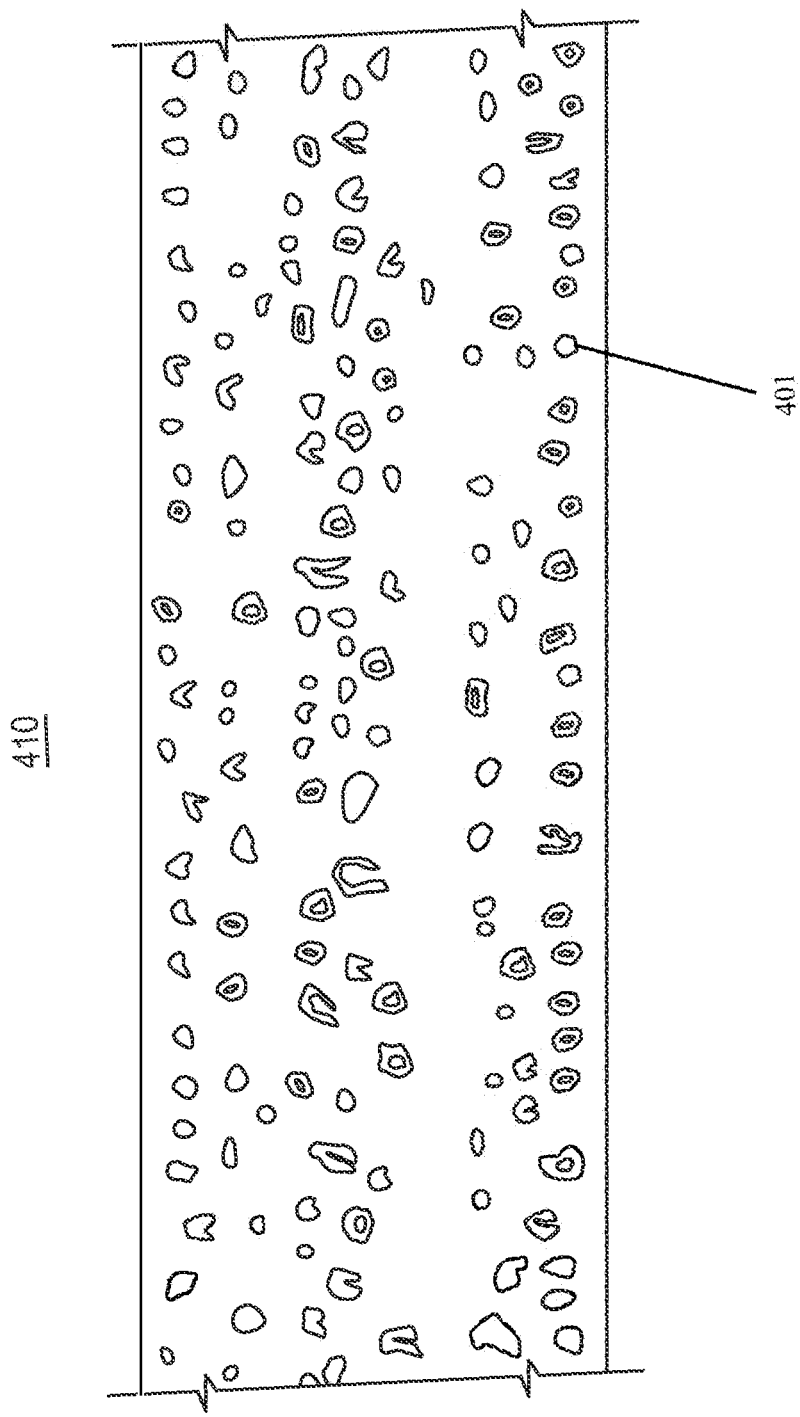

As described above, as gas is trapped and pushes toward the top of powder bed, as shown in FIGS. 3A-E, it may cause gas-filled flaws on the surface of the powder bed. These flaws may be referred to as "blisters" due to the visual appearance they cause on the surface of the powder bed. FIGS. 4A-4C show examples of the defects. FIG. 4A shows an image 410 of a top surface of a printed, un-sintered part (e.g., in the x-y plane) with numerous defects. In FIG. 4A, the surface defects may persist through sintering of the part. Thus, these defects may not only be present when printing a part, but may also be present after printing, debinding, and sintering or other post-processing, appearing as voids 401 in the part, also referred to as macropores. These voids 401 may be large compared to the characteristic size of the powder particles, and may have irregular or sharp corners. As a result, the voids may have a negative influence on the properties of the part, or be otherwise undesirable. For example, FIG. 4B shows a portion of a polished cross-section 420 through the build direction (z direction) of a sintered part containing defects. The voids 403 formed in each layer during the printing process persist through the sintering process and remain as voids in the finished sintered part, and can be revealed during a metallographic polishing process as voids inside the metal part. The defects have a high aspect ratio (that is, they are larger in the in-plane (x-y) directions than in the build (z) direction. and irregular or sharp corners. FIG. 4C shows a polished cross-section of a sintered part with the defect 403 in the x-y plane. In FIG. 4C, the pores are approximately equiaxed, reflecting the roughly equiaxed morphology of the defects observed on the top surfaces of parts during printing.

Printing may be performed at a particular saturation by depositing the binder in a desired manner. As used herein, saturation may refer to the fraction of pore space in a powder bed (e.g., a region or layer of the powder bed) that is filled with binder. Thus, saturation may correspond to a total amount of binder that is present within one or more layers of the powder bed in a particular area. At constant saturation, printing at slower speeds may tend to decrease the formation of macropores, while printing at larger layer heights may tend to increase the formation of macropores. When macropores do form, they may form with a spatial frequency independent of part dimension. Macropores tend to form when more fluid is deposited per unit area at a constant height layer, such as would result from an increase in saturation. Exemplary embodiments described herein may mitigate or eliminate the defects caused by trapped gas in the powder bed 124. In particular, the techniques herein may be drawn to negative features that may be intentionally printed to avoid the formation of macropores.

Reference is now made to FIG. 5, which shows example micro-dithering and macro-dithering processes for creating negatively printed features. FIG. 5A shows a plurality of micro-dithering at a first rate, in which the darkened areas represent the pixels where binder is jetted. FIG. 5B shows micro-dithering at a second rate, in which less binder is delivered than in the first grayscale. This process is akin to the creation of greyscale colors in inkjet printing wherein individual black and white pixels at a very high resolution, such that the human eye perceives an average color. This is opposed to altering the print drop size at each individual pixel, and thereby depositing a different amount of pigment at each point microscopically. Stated another way, dithering is a microscopically inhomogeneous pattern that allows an average binder level to be deposited that may be thought of as macroscopically homogenous at a larger lengthscale. Similar to how the amount of ink deposited per unit area is a parameter that affects color perception in two-dimensional inkjet printing, the amount of binder deposited per unit area may be a parameter that may be controlled to binder-induced defects in binder jetting three-dimensional printing. In some embodiments, techniques that permit more binder to be deposited per unit area while avoiding or substantially mitigating printing defects are thus desirable, as stronger parts will lead to higher printing yields and enable automated handling of parts for post-processing. FIG. 5C depicts macro-dithering, in which a concentrated area of negatively printing is performed, rather than a dispersed pattern. Nonetheless, as seen in FIG. 5C the macro-dithering is bound by deposited binder, and so in the final part the macro-dithering will sinter with the binder-bound regions as one continuous part.

A dithering algorithm may be used to deposit binder material on the powder bed to mitigate the macropores and/or other defect formations and tendencies described above. The dithering algorithm may result in regions of the powder bed to be "skipped" during binder deposition (e.g., "skipped" during the printing process), analogous to how pixels may alternate between black and white for greyscale printing. Microdithering as described herein involves "skipping" binder material deposition in small distances along the powder bed, while macrodithering involves "skipping" binder material deposition in larger distances along the powder bed. For example, a typical size of a "skipped" pixel in a microdithering algorithm may be set by the pixel size of the inkjet printer being used. For a 1200 dpi printing process, this size may be about 20 microns, for example, 21.2 microns, as shown in reference numeral. Common binder printer resolutions are 300, 400, and 600 dpi, which may result in pixel sizes of about 84.7, about 63.5, and about 42.3 microns, respectively. In contrast, a typical size of a "skipped" pixel in a macro-dithering algorithm may be within a range of about 100 microns to about 1000 microns, within a range of about 200 microns to about 300 microns, or approximately 250 microns. The approximately 20 microns may correspond to a pixel size of a standard 1200 dpi binder head. In particular, the inclusion of larger un-printed regions distributed throughout a printed part (macro-dithering) may allow gas to escape from the powder bed as binder material is deposited on the powder bed, e.g., at high speeds. One or more dimensions, e.g., a width of the un-printed regions (negatively printed features/gas-permeable printed regions), may be approximately 100 to 1000 microns, for example approximately 200 to 300 microns or approximately 250 microns. Rather than gas or other ambient gas only being able to escape at the edge of a part, a macrodithering pattern may provide intermittent gaps where no binder material is present on the surface of the powder bed and through which gas may escape once binder is deposited. In some aspects, by forming these gaps with sufficient spatial frequency, formation of macro-porosity may be avoided.

It should be noted that the dithering techniques described herein may be unintuitive in the greyscale inkjet printing context. For example, in inkjet printing, dithering is intended to distribute ink at a desired greyscale or color level as homogenously as possible. Thus, the concept of purposely causing dithering to occur at a larger length scale (macro-dithering) runs counter to typical applications of dithering in the ink-jetting context, as they would be discernable as undesirable patterns or visible features in the printed image. The larger-spaced dithering techniques described herein are unique to solving imbibition problems encountered in the context of high-speed binder jetting. In one example, the implementation of negatively printed features via a macro-dithering algorithm may address the macro-porosity problems described above while not drastically altering the amount of binder material deposited on the powder bed 124.

Figure 5A:
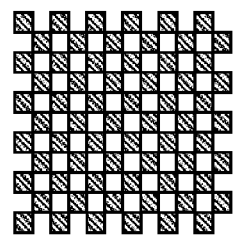
FIGS. 5A-D show example micro-dithering and example macro-dithering patterns for creating negatively printed features, such as features with differing saturation levels.
Figure 5B:
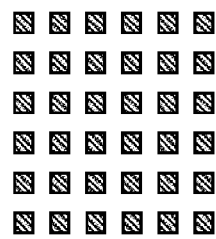
Figure 5C:
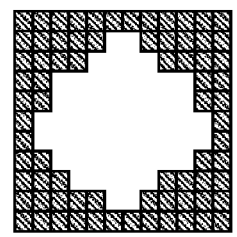

In FIG. 5C, the macro-dithered pattern (b) includes a negatively printed feature. In general, the negatively printed features where no or less binder is deposited (the light regions) in the macro-dithered pattern enable gas to escape the powder bed 124 and may mitigate gas entrapment issues by forming gas-permeable printed regions. For example, the negatively printed feature shown at may enable gas to escape from the powder bed. Macro-dithered patterns may be formed in a manner that changes a saturation of one or more layers or regions within a layer. Macro-dithering may be used such that while an overall saturation is maintained the negatively printed features create local areas of lower saturation and binder is jetted at a higher rate than usual in printed features. This may be accomplished in conjunction with or independently of micro-dithering. In another embodiment, a saturation may be changed by changing the spacing (e.g. a distance between negatively printed features) while keeping the size of the negatively printed features constant. While the above example contrasts micro-dithering and macro-dithering as two different methods for establishing a desired saturation during printing, it should be understood that micro-dithering and macro-dithering may be used simultaneously. For example, a printed part may contain a region wherein negatively printed features are used to allow for gas to escape, and the region in between the negatively printed features is printed. Thus in another embodiment, a printed part may contain regions of both macro-dithering and micro-dithering.

Figure 5D:
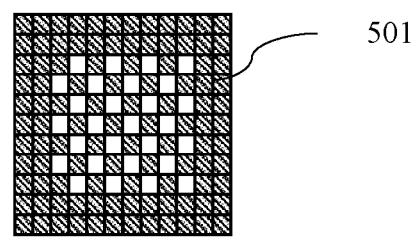

Now with reference to FIG. 5D, it is possible to print a skin 501 surrounding the dithering, in which no negative features are formed. As negative features printed in the macro-dithering patterns get larger, e.g., around 200 microns, the negative features printed near what would become the surface of the part may begin to impact the surface texture of the part. For example, the surface of the part may be rough where the negatively printed features touch or underlie the surface of the printed part. If, however, the perimeters of part layers are printed without negative features, or with fewer or smaller negative features, forming edges 612, 622, 632, then the benefits of macro-dithering may be realized without compromising or while only minimally impacting the surface characteristics of the part. The skin alternative may itself have a micro-dithering, should that be preferred for reasons related to establishing a desired saturation level, surface finish, or surface hardness if blister amelioration is required. Blister formation may be avoided, even in a that is relatively saturated with binder, if the thickness of the skin region is selected such that the gas beneath the imbibing binder can escape (as described in [0050]) as unlike in the interior of the part, the distance gas is required to travel to escape is not massively larger than the height of the layer.

Macro-dithering may allow parts to be printed in ways that are not possible with traditional binder jet printing. For example, in traditional binder jet printing, the general concept is that more binder should not be deposited locally than the volume or pore space available to be filled by the binder. If there is more binder than there is space for the binder to occupy within the part, then the binder will tend to bleed out into areas surrounding the part, which is generally undesirable. There is also often a tradeoff between layer adhesion (which may favor more binder deposition so that adjacent printed layers of a part coalesce to form a monolithic part) and bleed out of the binder (which may favor less binder deposition for the reasons just described). Adjacent printed layers of the part may only adhere close to the point of bleeding. Printing with regular pockets of negative features on the powder bed may however allow room for the binder to bleed within the part, such that binder may be printed locally at higher saturations than would normally be allowed due to binder bleed out. By including negative space within the part for binder to bleed into (e.g., at least partially during venting of gas within the layer or completely once the gas has been vented), bleeding may be controlled within the part so as to prevent the occurrence of bleeding defects on the exterior of the part, which may be undesirable due to the impact on surface finish and dimensional accuracy. This may allow for printing with higher saturation levels than would normally be possible, which may improve layer adhesion or part strength without causing detrimental bleeding.

Figure 6A:
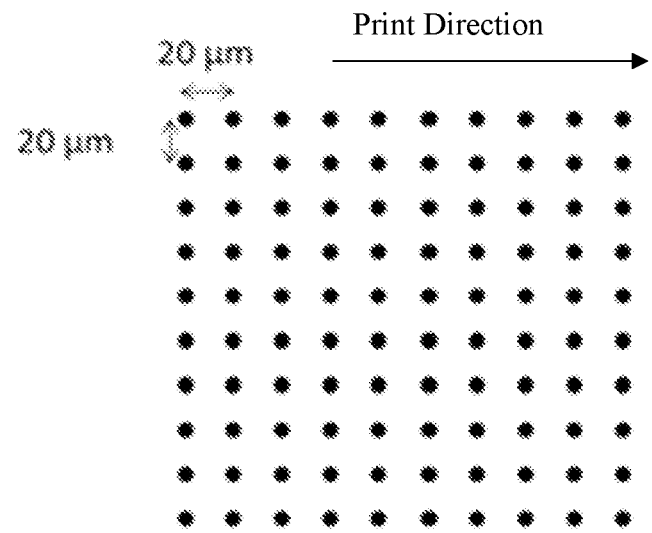
FIGS. 6A and 6B show example negatively printed features with similar saturation levels.
Figure 6B:
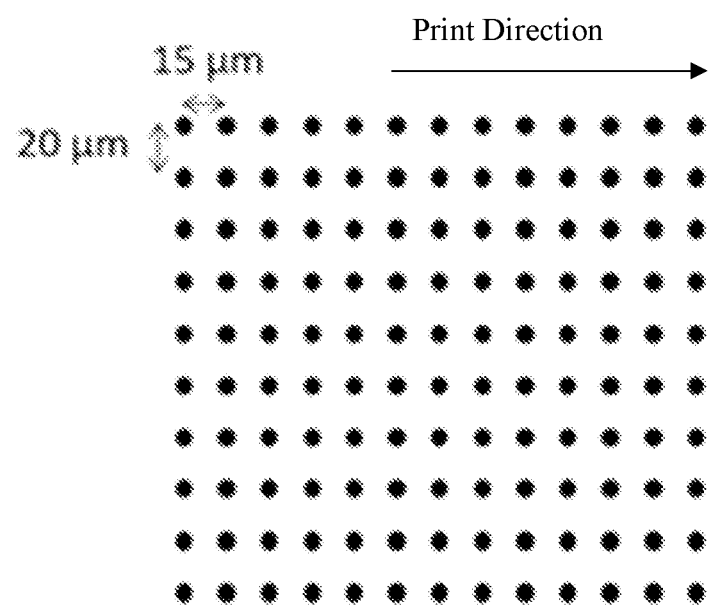

It should be understood that while the printing resolution along the print head is typically fixed due to the fixed location of the binder ejection orifices, the printing resolution in the direction of printhead traversal can be varied. In some embodiments, a saturation may be modified by changing a printing resolution (that is, a spacing of droplets in a printing direction) to be the same, or higher, or lower, than a spacing of droplets in a direction normal to a printing direction. FIG. 6A depicts a scenario in which binder is printed at the same resolution in both the print direction and the cross-print direction. Across the print bed, in embodiment the total resolution is 1200 dpi×1200 dpi as an image of the binder deposited. FIG. 6B depicts a scenario in which binder is printed at a higher resolution (i.e., less space between deposited drops of binder) in the print direction than in the cross-print direction. Across the print bed, in the embodiment the total resolution may be 1800 dpi×1200 dpi as an image of the binder deposited. Higher resolutions in the print direction (e.g., spacing binder droplets closer together) may be obtained by slowing down the print speed and printing at the same time frequency, by printing droplets at a higher speed while maintaining the print speed or even by increasing the number of nozzles depositing binder in a particular path. In an embodiment, a saturation in a region outside the negative features (that is, in the printed regions) may be higher than a saturation that could be used in an equivalent printed region not including negative features. The overall part saturation may be held constant by increasing the total area of the negative features, either by changing the size of the negative features or by decreasing the spacing between them. This technique may allow for independent optimization for layer-to-layer stitching (for which higher greyscale is preferred) and overall saturation (for which lower saturation is desired, to prevent bleeding).

Figure 7:
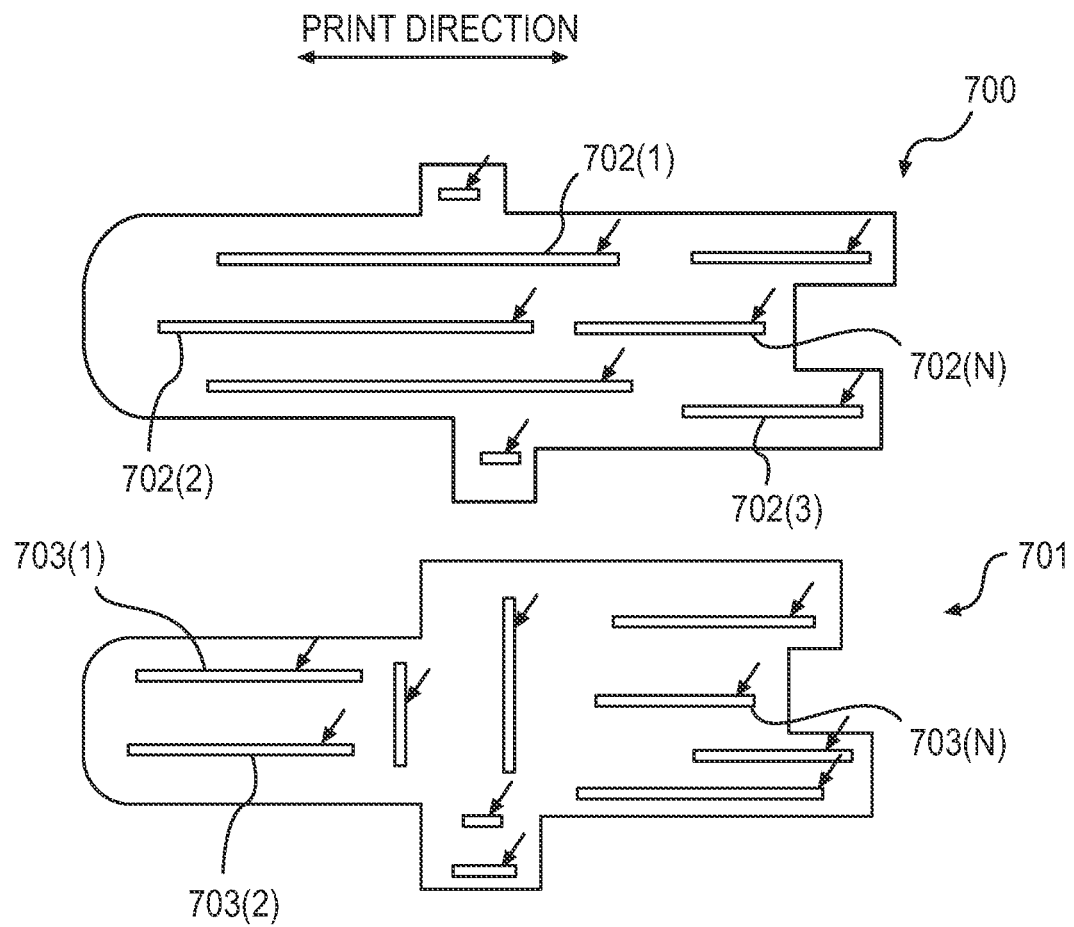
FIG. 7 shows a printed stricture with negative features of high aspect ratios.

It is also noted that the optimal shape for the negatively printed features within a part may not be equiaxed. Rather, the optimal structure for preventing blistering defects may be a feature with a high perimeter per unit area ratio. Indeed, a higher aspect ratio feature closer to a line than a circle or a square shape may be favorable. Reference is now made to FIG. 7, which shows two layers 700, 701 of a printed object with negative features of higher aspect ratios. In one example, layers 700, 701 of the printed object may have negative features that, in some examples, may resemble a line. FIG. 7 shows negative features 702(1)-702(n) on layer 700 of the printed object. The high aspect ratios of the negative features 702(1)-702(n) may be designed to permit the exit of gas or vapor prior to closure and to prevent subsequent formation of macropores, as will be described below. The negative features 703(1)-703(n) of layer 701 may be offset or adequately spaced relative to one another and relative to the negative features 702(1)-702(n) of layer 700 to achieve optimal gas escaping from the powder bed 124 and defect mitigation. In at least some embodiments, the spacing between the negative features (i.e., the offset) may be equal to the spacing between the observed blisters for objects printed without negative features or other improvements described herein to resolve defect formation. Additionally, in at least some embodiments, the spacing between the negative features (i.e., the offset) may be smaller (e.g., by a factor of ½th, ⅕th, ¹⁄₁₀th, or smaller) than the spacing between the observed blister defects. Furthermore, in at least some embodiments, spacing of the negative features may correspond to the estimated characteristic spatial period for a capillarity-driven instability, which may correspond to:

$$2\pi\sqrt{\frac{\text{Surface Tension}}{\text{Density} \times \text{Gravitational Acceleration}}}.$$

The spacing may range from about 1 to about 10 millimeters, or from about 0.2 to about 1 millimeters. Offsetting negative features in adjacent layers of a part may prevent the formation of large voids spanning multiple layers within the interior region of a part. Offsetting negative features in adjacent layers may involve spacing the negative features of adjacent layers so that they do not overlap, or spacing negative features of adjacent layers so that they partially overlap. Non-overlapping or partially overlapping negative features may lead to improved strength of the printed part, which may increase part survival during depowdering or other part processing and improve overall process yield.

Figure 8A:
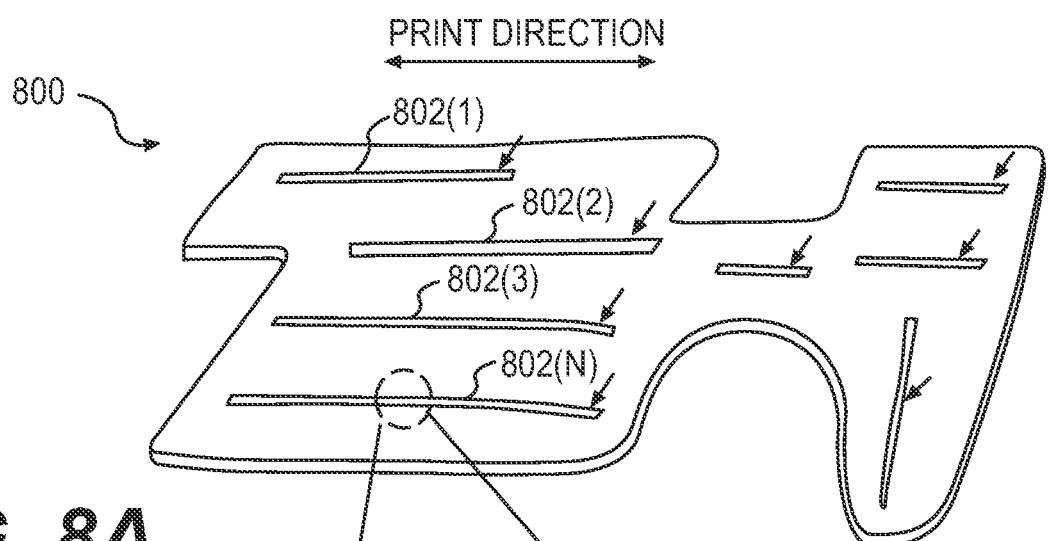
FIGS. 8A and 8B show example void spaces that allow for gas permeation.
Figure 8B:
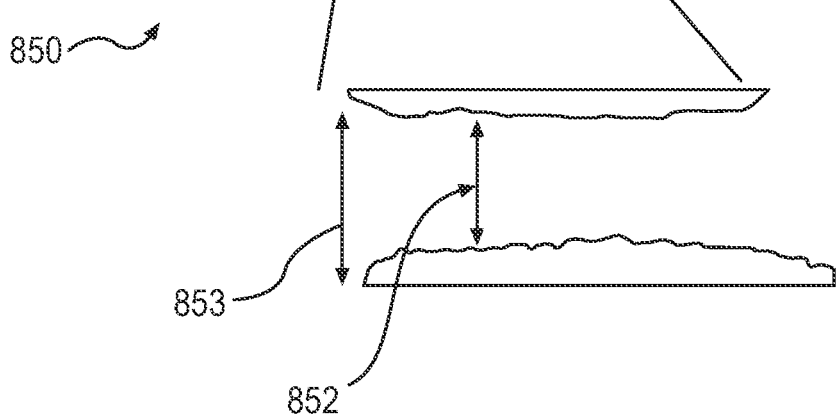

Reference is now made to FIGS. 8A and 8B which show example void spaces that allow for gas permeation. FIG. 8A shows a part layer 800 of a printed object with multiple negative features 802(1)-802(n), and FIG. 8B shows an enlarged view 850 of one of the negative features (e.g., 802(n)). It should be appreciated that the negative features 802(1)-802(n) are similar in object and function as those described in FIG. 7 above for negative features 702(1)-702(n). In some instances, the width of the negative features 802(1)-802(n) (e.g., the minimum dimension spanning the un-printed section) as printed may exceed twice the distance that the printed ink might bleed in the powder bed for printed conditions (e.g., for saturation). The printed width of one negative feature is shown by arrow 853 in FIG. 8B. The amount of bleeding may be a function of the saturation, fluid properties, and powder, and may generally be within a range of about 0 microns to about 100 microns for typical successful conditions, in particular, within a range of about 0 microns to about 25 microns. In some aspects, the amount of bleeding may have a minimal width of about 50 microns. In some circumstances, however, the bleeding may occur on a timescale sufficiently longer than the timescale for gas to escape, such that the negatively printed features may be closed by binder bleeding after gas escape has occurred. In this situation, the dimensional bound of negative features due to bleeding may not apply. The minimum width of negative features 802(1)-802(n) may be chosen such that at least some portion of the negative features will remain open and will permit gas to permeate the powder bed 124 through the surface of the part interior even after some bleeding occurs, which may narrow the actual width of the negative feature from what was printed. For example, as shown in FIG. 8B, the width of the negative feature after bleeding has occurred is represented by arrow 852. Given that macro-dithering may be at least several pixels wide, and typical pixel sizes may be 21.2 microns or 42.3 microns, minimal widths for such features may be within the range of about 75 to about 120 microns, which is in line with the minimal widths sufficient to be robust to bleeding as well.

As the goal of the printing process is to produce a solid part with substantially uniform packing density, the placement of the negative features may be deliberate to avoid weakening the part or producing regions of varying powder density or binder density. For example, as discussed above with reference to FIG. 7, one approach may be to shift the location of the negative features in adjacent layers of a part such that they do not lie substantially on top of one another. Another approach may be to alter the spacing or the orientation of the negative features within a layer.

Reference is now made to FIGS. 9A and 9B, which show example alignments of negatively printed features relative to the print direction. FIG. 9A shows a first example alignment 900 within a layer of a part in which the negatively printed features 902(1)-902(n) are aligned in a normal direction (e.g., a perpendicular direction) relative to the direction of printing, which is shown at reference numeral 904. The negatively printed features 902(1)-902(n) may result in a stronger brown part that is more robust to printing defects. For example, negative features aligned normal to the direction of printing may make a part less susceptible to weakening (and thus breakage and yield loss) caused by a "jets out" printing defect. A jets out printing defect may occur when a nozzle for distributing binder is clogged or otherwise malfunctions, resulting in a line of missing binder within a part layer. An example of a print defect consisting of a line of missing binder caused by a jets out printing defect is shown in FIG. 9A.

FIG. 9B shows a second example alignment 910 in which the negatively printed features 912(1)-912(n) are aligned parallel to the direction of printing, which is shown at reference numeral 914. FIG. 9B shows the same jets out print defect shown in FIG. 9A, only in FIG. 9B, the parallel orientation of the negatively printed features causes the defect to have a bigger impact on the part. Since a jets out defect occurs in the direction of printing and results in a missing line of binder along the printing direction of a layer, and the negatively printed features in FIG. 9B are also oriented in the direction of printing, the overlap of the jets out defect and the negatively printed features may cause wider regions where no binder is deposited within a part where the defect and the feature overlap. This may have a greater impact on the structural integrity of the resulting part as compared to the orientation of negatively printed features in FIG. 9A. Accordingly, the negatively printed features 912(1)-912(n) oriented parallel to the print direction may result in a weaker brown part structure relative to the alignment 900 in FIG. 9A due to the greater impact of potential defects that also result in missing binder in the print direction.

Various geometries may include varying or aligning the orientation of the negative features within a layer or across multiple stacked layers. For example, within a layer, a first set of negatively printed features may be orientated at 90 degrees to the print direction, a second set may be oriented at 45 degrees, a third set at 0 degrees, and so forth, with subsequent layers cycling through additional orientations. In another example aspect, a first layer may include a first set of negatively printed features orientated at 90 degrees to the print direction, an adjacent second layer may include a second set of negatively printed features oriented at 45 degrees to the print direction, an adjacent third layer may include third set of negatively printed features oriented at 0 degrees relative to the print direction, and so on, with subsequent layers oriented at different angles relative to the negatively printed features of the adjacent layers. The orientation angles of negatively printed features provided are only examples, and it is recognized that any suitable angles may be used in such embodiments, so long as the angles of one layer are different from the angles of adjacent layers.

Figure 10:
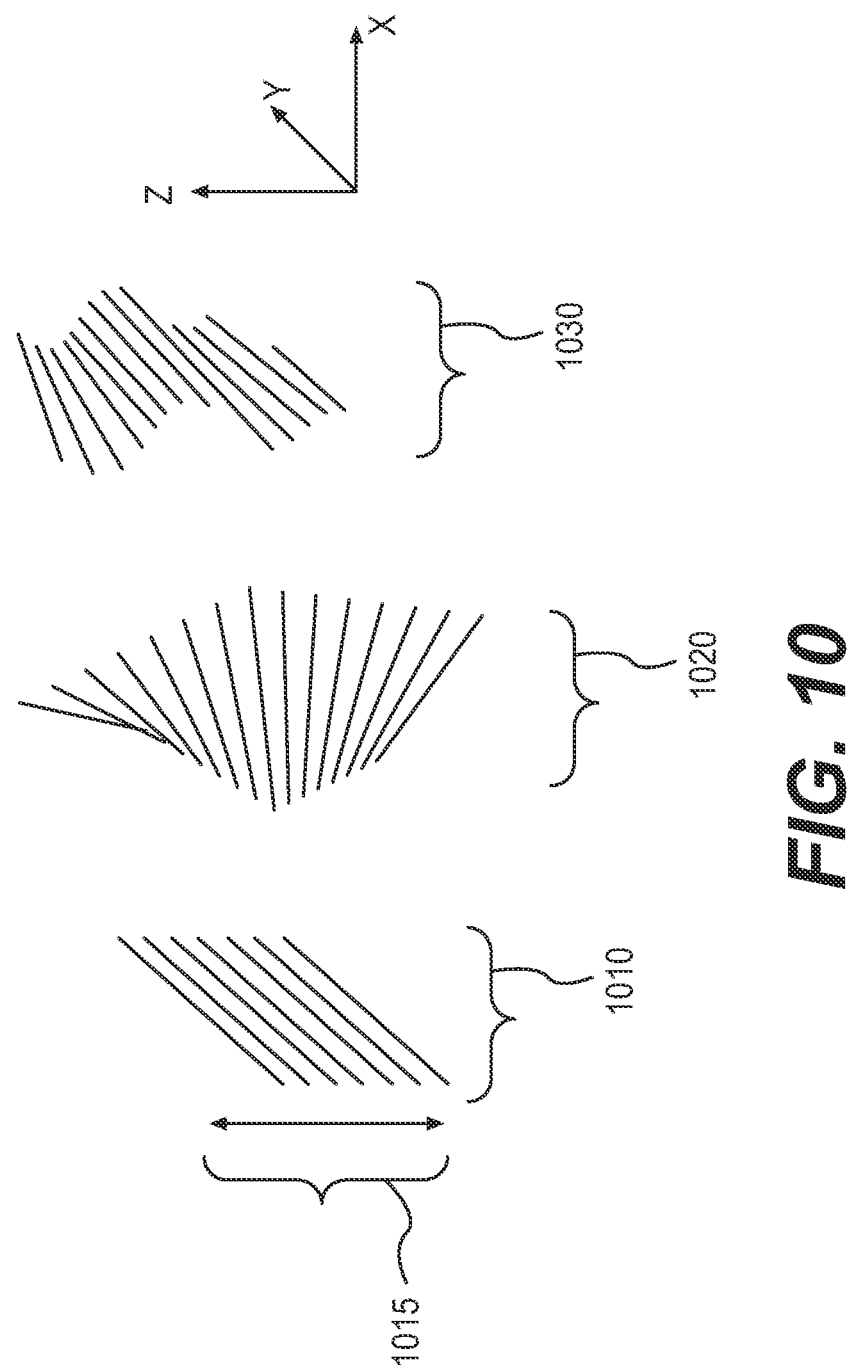
FIG. 10 shows example geometries for arranging the negative features.

Reference is now made to FIG. 10, which shows other example orientations for arranging the negative features. Reference numeral 1010 shows a plurality of negative features with orientations aligned along the layering axis (e.g., vertical direction), shown by arrow 1015. Aligning the negative features along the layering axis may promote optimal stitching (adhering) of adjacent layers, which may lead to increased brown part strength. This approach may allow less binder to be used to attain a desired level of strength in the z-direction (e.g., along the layering axis 1015). Reducing the amount of binder that is used may result in additional benefits, such as a reduction in undesired lateral spreading (e.g., bleeding) of binder, as discussed above.

Another approach is to vary the orientation of the negative features, as shown at reference numeral 1020. There is a potential concern that the lack of binder printed in a high aspect ratio may predispose a part to cracking. The lack of binder deposition in many stacked layers may act like an incipient sharp crack running through the part. A compromise between layer adhesion (i.e., printing binder on top of regions with binder deposited in the previous layer) and preventing cracking may be achieved in some aspects by rotating the lines of negatively printed features by a small amount from layer to layer such that there is substantial overlap from one layer to the next but there is a gentle twist across multiple, vertically stacked, layers, as shown at reference 1020. For example, the negative features may form a helix that extends along multiple, vertically stacked layers. Amounts of rotation may be substantially less than 45 degrees. In some aspects, 7-10 degrees may be a desirable amount of rotation, although rotations from 1-45 degrees may be employed and may be advantageous as compared to an un-rotated pattern.

Instead of a helix, there may be a substantial overlap of negatively printed features from one layer to the next, but they may be offset so as to form a stagger or 'wiggle' across multiple, vertically stacked layers, as shown in reference numeral 1030, rather than spinning vertically across layers.

Figure 11:
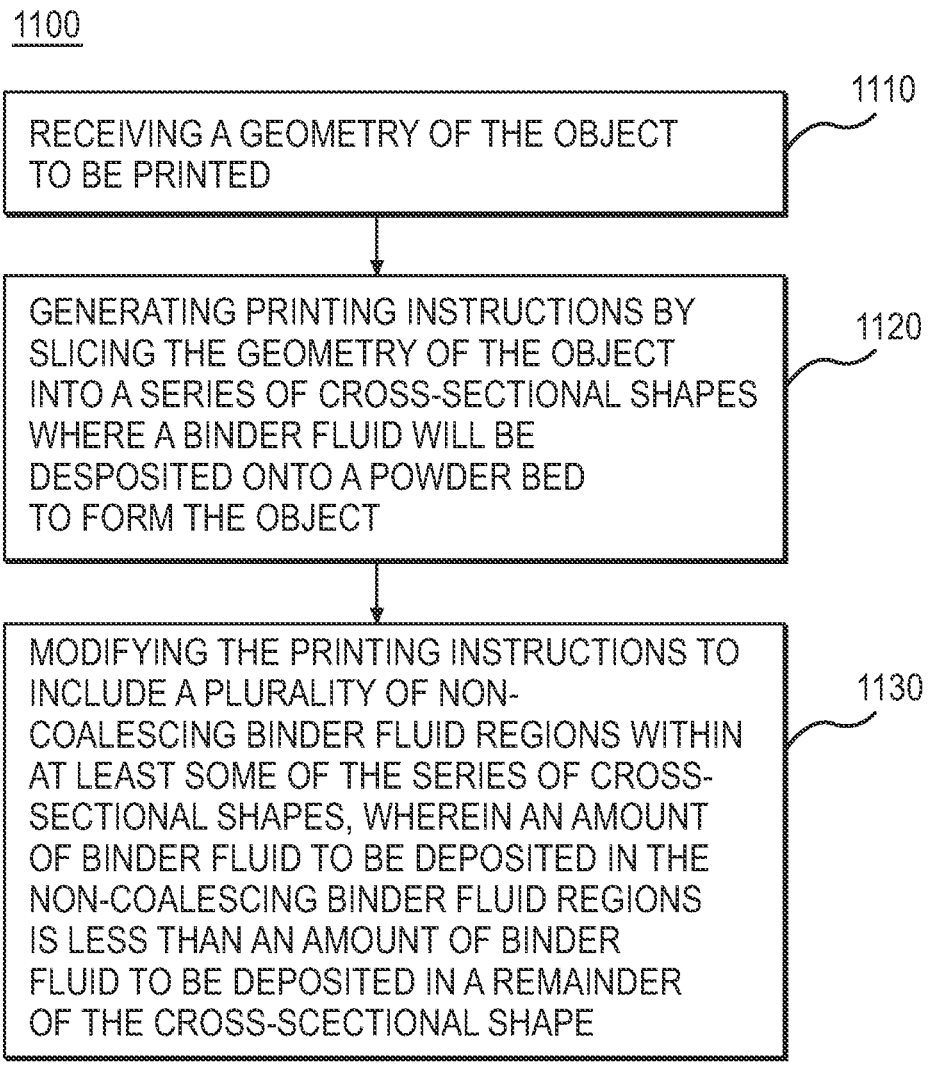
FIG. 11 shows a first example flow chart depicting operations for creating the negatively printed features.

FIG. 11 shows a first example flow chart 1100 depicting a method for creating the negatively printed features. At step 1110, a geometry of a three-dimensional (3D) object is received (e.g., by a computing device). The computing device may be separate from system 100, described above, or may be incorporated into one or more components of system 100. At step 1120, printing instructions for forming an object are generated by slicing the geometry of the object into a series of cross-sectional shapes, corresponding to where a binder fluid will be deposited onto a layer of the powder bed to form the object. Alternatively, the printing instructions may be received by the computing device from another source rather than generated by the computing device. At step 1130, the printing instructions are modified to include a plurality of negatively printed features (also known as gas permeable printed regions) within at least some of the series of cross-sectional shapes. An amount of binder fluid to be deposited in the negatively printed features will be less than an amount of binder fluid to be deposited in a remainder of the cross-sectional shape. In some aspects, the size of the negatively printed features regions may be correlated with, for example, may share a direct relationship with, an intended print speed of the object. In an embodiment, the steps of generating printing instructions 1120 and modifying the printing instructions 1130 to include negative features may comprise a single step, that is, the generation of printing instructions may also comprise the step of including negative features.

Figure 12:
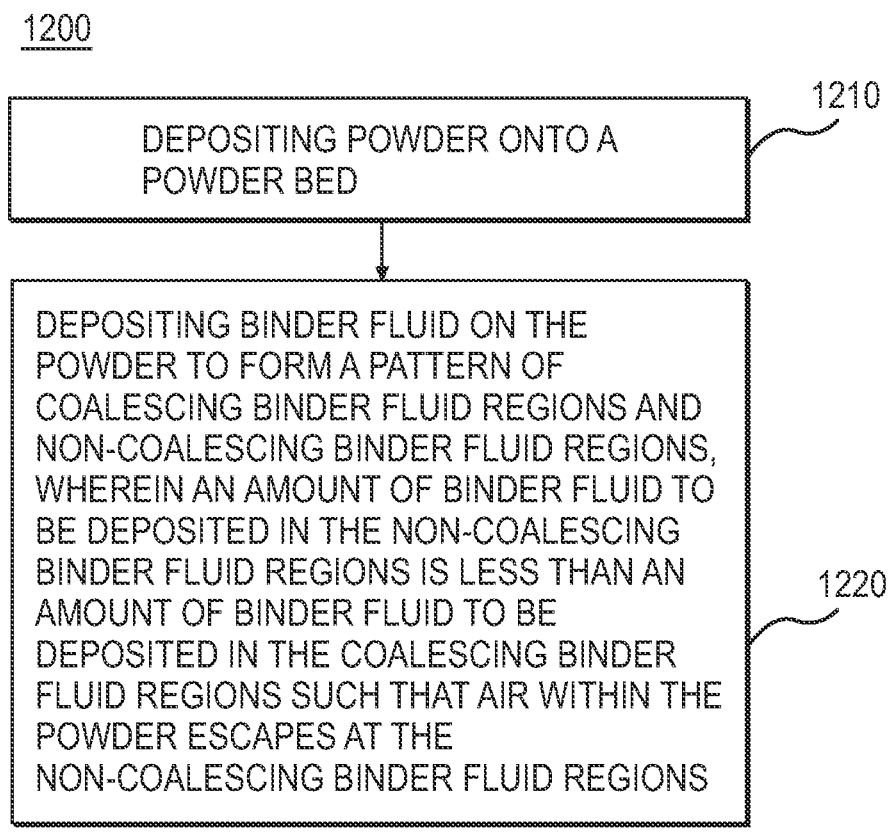
FIG. 12 shows a second example flow chart depicting operations for creating the negatively printed features.

Reference is now made to FIG. 12, which shows a second example flow chart 1200 depicting a method for creating the negatively printed features. At step 1210, powder is deposited onto a powder bed, and a layer of powder is formed. At step 1220, binder fluid is deposited on the powder layer to form a pattern of printed binder fluid regions and gas permeable, negatively printed features to form a layer of a part. An amount of binder fluid to be deposited in the gas permeable, negatively printed regions is less than an amount of binder fluid to be deposited in the printed binder fluid regions, such that interstitial gas within the layer of powder escapes at the gas permeable, negatively printed features. Steps 1210 and 1220 may be repeated until a part is formed. In some aspects, the method of FIG. 11 (or FIG. 13, described below) may be performed, followed by the steps of FIG. 12, in order to form a part. In such aspects, step 1220 may be performed according to the modified printing instructions generated in step 1130 or step 1330 (described below).

Figure 13:
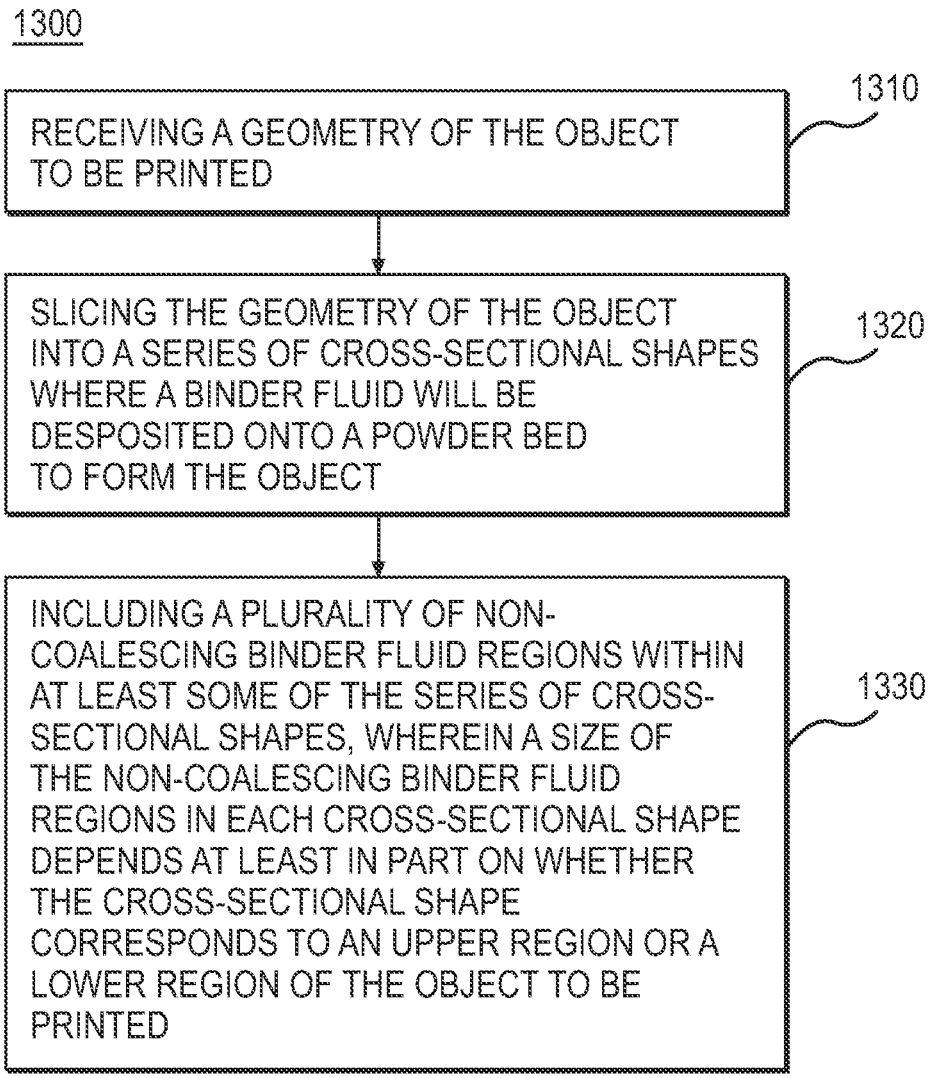
FIG. 13 shows a third example flow chart depicting operations for creating the negatively printed features.

Reference is now made to FIG. 13, which shows a third example flow chart depicting a method 1300 for creating the negatively printed features. At step 1310, a geometry of a three-dimensional (3D) object is received (e.g., by a computing device). The computing device may be separate from system 100, described above, or may be incorporated into one or more components of system 100. At step 1320, printing instructions are generated by slicing the geometry of the object into a series of cross-sectional shapes where a binder fluid will be deposited onto a powder bed to form the object. At operation 1330, the printing instructions are modified to include a plurality of negatively printed features within at least some of the series of cross-sectional shapes. A size of the negatively printed features in each cross-sectional shape in method 1300 may depend at least in part on whether the cross-sectional shape corresponds to an upper region or a lower region of the object to be printed. In some aspects, a number of the negatively printed features in each cross-sectional shape may depend at least in part on whether the cross-sectional shape corresponds to an upper region or a lower region of the object to be printed. For example, smaller or fewer negatively printed features may be included in cross-sectional shapes corresponding to upper or lower regions of the object to be printed, or no negatively printed features may be included in cross-sectional shapes corresponding to upper or lower regions of the object to be printed. Including fewer or smaller negatively printed features at the extremities of an object may, for example, enhance the strength of the part or may promote formation of a smoother part surface.

Further, as described in reference to FIGS. 6A, 6B, and 6C, the perimeters of cross-sectional shapes may include fewer (or no) negative features. Combined with the description of FIG. 13 (e.g., smaller or fewer negatively printed features included in cross-sectional shapes corresponding to upper or lower regions of the object to be printed), instructions for forming a 3D object may be generated that include smaller, fewer, or no negatively printed features on outer surfaces of the object (e.g., upper or lower surfaces or outer perimeters of more centrally-located slices). As described, this may improve the surface characteristics or strength of the object.

Figure 14:
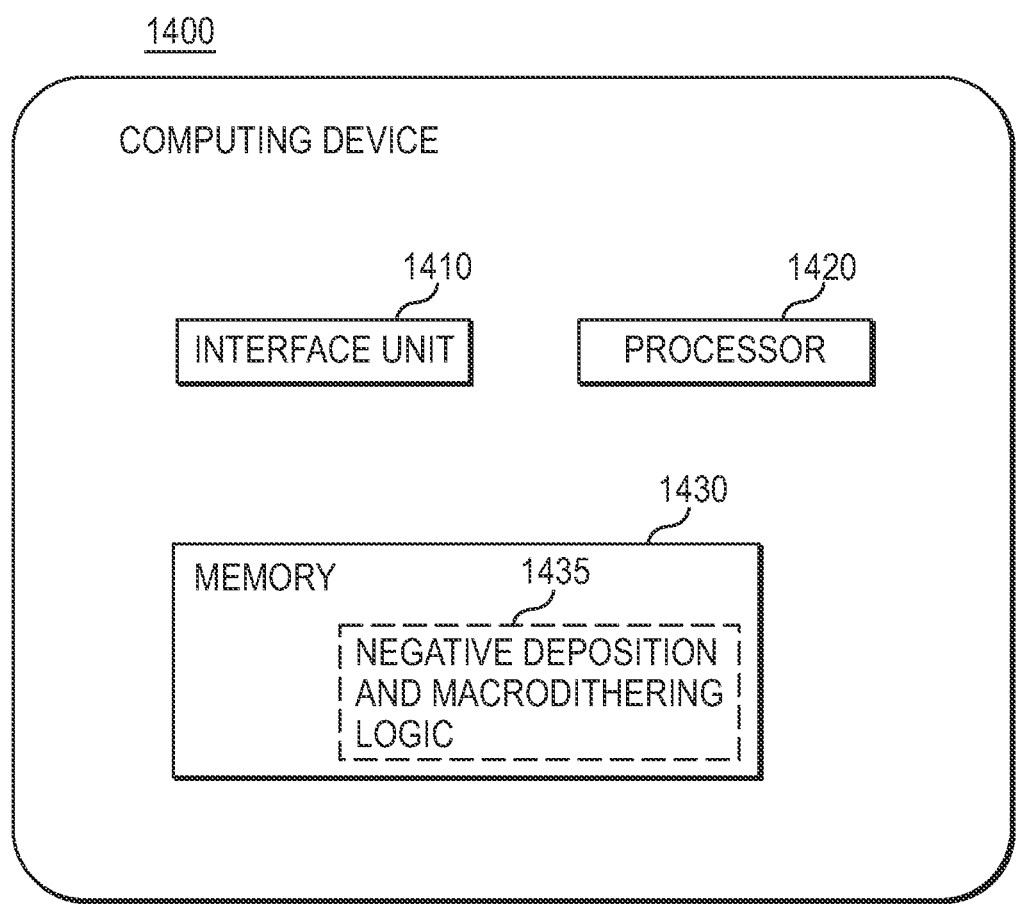
FIG. 14 shows an example block diagram of a computing device configured to execute negative deposition and macro-dithering logic, according to the techniques described herein.

Reference is now made to FIG. 14, which shows an example block diagram of a computing device 1400 configured to execute negative deposition and macro-dithering logic, according to the techniques described herein. The computing device 1400 may comprise an interface unit 1410, a processor 1420, and a memory 1430. The memory 1430 may store the negative deposition and macro-dithering logic 1435, which when executed by the processor 1420, is configured to enable the processor to perform the macro-dithering operations described herein. Memory 1430 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code such as the macro-dithering logic 1435) may be stored in any volatile and/or non-volatile memory component of memory 1430. The computing device 1400 may be separate from system 100, described above, or may be incorporated into one or more components of system 100.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

Other embodiments of the present disclosure will be apparent to those skilled in the art from consideration of the specification and practice of the embodiments disclosed herein. While certain features of the present disclosure are discussed within the context of exemplary systems, devices, and methods, the disclosure is not so limited and includes alternatives and variations of the examples herein according to the general principles disclosed. It is intended that the specification and examples be considered as exemplary only, with a true scope and spirit of the present disclosure being indicated by the following claims.

What is claimed is:

1. A method for binder jetting a three-dimensional (3D) object, the method comprising:
   receiving a geometry of the object to be printed; and
   generating instructions for printing the object, wherein generating the instructions comprises:
      slicing the geometry of the object into a series of cross-sectional shapes corresponding to where a binder fluid will be deposited onto a powder bed to form the object; and
      including a plurality of negatively printed features within at least some of the series of cross-sectional shapes, wherein an amount of binder fluid to be deposited in the negatively printed features is less than an amount of binder fluid to be deposited in a remainder of the cross-sectional shape,
   wherein the amount of binder fluid to be deposited in the negatively printed features and a size of the negatively printed features is configured to allow gas to escape from the powder bed.

2. The method of claim 1, wherein binder fluid is not deposited in the negatively printed features.

3. The method of claim 1, wherein at least one of the plurality of negatively printed features has a length that is greater than a width, and wherein the length is oriented non-parallel to a direction of printing.

4. The method of claim 1, wherein at least some of the plurality of negatively printed features have a width of about 100 to about 500 microns.

5. The method of claim 1, wherein at least some of the plurality of negatively printed features are spaced about 200 to about 300 microns away from each other.

6. The method of claim 1, wherein at least some of the series of cross-sectional shapes includes a perimeter region and an interior region, and wherein at least one of (i) an amount of binder fluid to be deposited at the perimeter region, (ii) a number of negatively printed features to be formed at the perimeter region, or (iii) a size of negatively printed features to be formed at the perimeter region is different than an amount of binder fluid to be deposited at the interior region, a number of negatively printed features to be formed at the interior region, or a size of negatively printed features to be formed at the interior region.

7. The method of claim 1, wherein a plurality of negatively printed features in a first cross-sectional shape of the series of cross-sectional shapes are at least partially offset in at least one of an x-direction or y-direction from a plurality negatively printed features in a second cross-sectional shape of the series of cross-sectional shapes.

8. The method of claim 1, wherein a size of at least some of the plurality of negatively printed features is at least partially correlated with an intended print speed of the object.

9. A method for binder jetting a three-dimensional (3D) object, the method comprising:
depositing metal powder onto a powder bed to form a layer; and
depositing binder fluid on the layer to form a pattern of adhering binder fluid regions and negatively printed features, wherein an amount of binder fluid to be deposited in the negatively printed features is less than an amount of binder fluid to be deposited in the adhering binder fluid regions, and wherein the amount of binder fluid to be deposited in the negatively printed features is configured to allow gas within the powder bed to escape.

10. The method of claim 9, wherein a size of the negatively printed features increases as a speed of the binder fluid deposition increases.

11. The method of claim 9, wherein a size of the negatively printed features is based at least in part of at least one of surface tension of the binder when deposited in the metal powder and the viscosity of the binder in a liquid state.

12. The method of claim 9, wherein a size of the negatively printed features is based at least in part on a thickness of the layer.

13. A method for binder jetting a three-dimensional (3D) object, the method comprising:
receiving a geometry of the object to be printed; and
generating instructions for printing the object, wherein generating the instructions comprises:
slicing the geometry of the object into a series of cross-sectional shapes corresponding to where a binder fluid will be deposited on a powder bed to form the object; and
including a plurality of negatively printed features within at least some of the series of cross-sectional shapes, wherein an amount of binder fluid to be deposited in the negatively printed features is configured to allow gas to escape from the powder bed, and wherein at least one of (i) the size of the negatively printed features in each cross-sectional shape or (ii) a number of the negatively printed features in each cross-sectional shape depends at least in part on whether the cross-sectional shape corresponds to an upper region or a lower region of the object.

14. The method of claim 13, wherein binder fluid is not deposited in the negatively printed features.

15. The method of claim 13, wherein at least one of the plurality of negatively printed features has a length that is greater than a width, and wherein the length is oriented non-parallel to a direction of printing.

16. The method of claim 13, wherein at least some of the plurality of negatively printed features have a width of about 200 to about 300 microns.

17. The method of claim 13, wherein at least some of the plurality of negatively printed features are spaced about 200 to about 1000 microns away from each other.

18. The method of claim 13, wherein at least some of the series of cross-sectional shapes includes a perimeter region and an interior region, and wherein at least one of (i) an amount of binder fluid to be deposited at the perimeter region, (ii) a number of negatively printed features to be formed at the perimeter region, or (iii) a size of negatively printed features to be formed at the perimeter region is different than an amount of binder fluid to be deposited at the interior region, a number of negatively printed features to be formed at the interior region, or a size of negatively printed features to be formed at the interior region.

19. The method of claim 13, wherein a plurality of negatively printed features in a first cross-sectional shape of the series of cross-sectional shapes are at least partially offset in an x-direction or y-direction from a plurality of negatively printed features in a second cross-sectional shape of the series of cross-sectional shapes.

20. The method of claim 13, wherein a size of at least some of the plurality of negatively printed features is at least partially correlated with an intended print speed of the object.

* * * * *